(12) United States Patent
Li

(10) Patent No.: US 9,997,939 B2
(45) Date of Patent: *Jun. 12, 2018

(54) HUB

(71) Applicant: SIMPOWER TECHNOLOGY INC., Taipei (TW)

(72) Inventor: Dong-Sheng Li, Taipei (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/820,528

(22) Filed: Nov. 22, 2017

(65) Prior Publication Data

US 2018/0097385 A1    Apr. 5, 2018

Related U.S. Application Data

(63) Continuation-in-part of application No. 14/992,130, filed on Jan. 11, 2016, now Pat. No. 9,864,421.

(51) Int. Cl.
| | |
|---|---|
| G06F 13/00 | (2006.01) |
| H02J 7/00 | (2006.01) |
| G06F 13/42 | (2006.01) |
| G06F 13/38 | (2006.01) |
| H02M 7/00 | (2006.01) |
| H02J 5/00 | (2016.01) |

(52) U.S. Cl.
CPC .......... *H02J 7/0052* (2013.01); *G06F 13/385* (2013.01); *G06F 13/4282* (2013.01); *H02J 5/00* (2013.01); *H02J 7/0045* (2013.01); *H02M 7/003* (2013.01); *G06F 2213/0042* (2013.01); *H02J 2007/0059* (2013.01); *H02J 2007/0062* (2013.01)

(58) Field of Classification Search
None
See application file for complete search history.

(56) References Cited

U.S. PATENT DOCUMENTS

| | | | |
|---|---|---|---|
| 8,193,663 B2 | 6/2012 | Sato | |
| 9,748,788 B2 * | 8/2017 | Sporck | H02J 7/007 |
| 9,836,085 B2 * | 12/2017 | Peng | G06F 1/1632 |
| 2005/0033996 A1 | 2/2005 | Fong et al. | |

FOREIGN PATENT DOCUMENTS

| | | |
|---|---|---|
| CN | 102255376 A | 11/2011 |
| CN | 102833878 A | 12/2012 |
| CN | 103744815 A | 4/2014 |
| JP | 2000010671 A | 1/2000 |

\* cited by examiner

*Primary Examiner* — Cheng-Yuan Tseng

(57) ABSTRACT

A hub electrically connected to an electronic equipment and at least a portable device located in external environment is provided. The hub includes a first connector, at least a second connector, and a first DC/DC converter. The first connector is electrically connected to the electronic equipment, the second connector is electrically connected to the portable device. Data transmission between the portable device and the electronic equipment mutually is via the signal transmission line, the first connector, and the second connector. An input terminal of the first DC/DC converter is electrically connected to the electronic equipment, and an output terminal of the first DC/DC converter is electrically connected to the portable device, the first DC/DC converter is applied to output stable voltage to the portable device.

19 Claims, 18 Drawing Sheets

HUB

BACKGROUND OF THE INVENTION

Field of Invention

The present invention relates to a hub, especially relates to a hub having complex power converters for data transmission and rapid charge.

Description of Related Art

In recent years, with the development of science and technology, sizes of various portable devices (such as smart phones) become smaller gradually, and develop for the direction which the portable device is convenient to carry. Certainly, the portable devices usually need to maintain normal operation depending on a battery, and the portable devices are required to charge immediately when the battery power is exhausted.

Currently, a common USB 2.0 port can provide a rated current of 500 mA, a common USB 3.0 port can provide a rated current of 900 mA, and a common USB Type-C port can provide a rated current of up to 1.5 A or 3 A. A mobile electronic device generally detects the type of an USB port by means of various communication methods (for example, DP and DN signals, cc1 and cc2 signals for USB Type-C, or FSK technology of 5 VBUS for USB PD) to determine whether the USB port is general purpose for signal transmission (such as SDP) or an USB port for high charging current only (such as DCP) or both of the two function (such as CDP). The type of the USB port is identified after the mobile electronic device handshakes with an electronic device (for example, a desktop computer) that the USB port belongs to, and after a charging condition (including a voltage level and a charging current level) is determined, quick charging can start (where quick charging is defined as charging current higher than 500 mA). After the quick charging function is enabled, some mobile devices can indicate a charging current of about 1 A, some can indicate a charging current of up to 2.4 A, and mobile devices with an USB Type-C port can even indicate a maximum charging current of 3 A. However, the higher the charging current is, the greater the voltage drop caused by USB cable, connector and the like will be. An extra low output voltage may result in abnormal operation of the electronic device.

Nowadays, the portable devices can be charged via USB port on PC or apply the AC adapter (or named by charger). USB ports on PC or NB usually provide standard charging mode (SDP), 500 mA. However, with the various portable devices, users often own at least two kinds of the portable devices, such as mobile phones, portable HDD, tablets, or digital camera etc., and the amount of USB ports in a general desktop computer may be not enough for use. Therefore, users can buy an USB hub to expand the amount of the USB ports. Especially small size notebook computers emphasize the portability, and may have two USB ports or even one port in future. In addition to carry the devices such as mobile phones, notebook computers, and the hub etc., the peripherals and accessories such as adapters for charging will increase the amount users carried and are very inconvenient to carry when users go out. At present, there are a number of electronic products for charging rapidly (such as car charger, or AC to multi-USB ports charger). Although the products can provide enough power to mobile electronic devices for charging rapidly, but the portable devices are unable to transmit data. In addition, although the traditional USB hub can expand the USB ports for the portable devices to transmit data simultaneously, but the general USB ports just provide limited power for preventing over current or the lack of function to activate quick charging and data transmission simultaneously (such as CDP mode). Thus, the portable devices are allowed to perform a standard charging mode only so that the function of rapid charge can't be provided by the hub. Furthermore, fewer hubs still can supply more power via an additional adapter, but at least two accessories are needed to carry when user go out, and this also increases the cost and inconvenience. Wherein, some USB hubs even need to switch manually between the USB power and the external power converter by a manual switch for either data transmission or charging function only, which is quite inconvenient.

Therefore, how to solve the problems described above, and create a product that integrates the function of data transmission, better portability, rapid charge and low cost, which need to consider by the skilled person.

SUMMARY OF THE INVENTION

To solve the problems described above, one aspect of the invention is to provide a hub with functions of data transmission and rapid charge, and have a better portability for charging anywhere.

To achieve the foregoing and other aspects, a hub is provided. The hub is electrically connecting to an electronic equipment and at least a portable device located in external environment via an Universal Serial Bus cable. The Universal Serial Bus cable comprises a signal transmission line and a power transmission line. The hub comprises a first connector, at least a second connector, a first DC/DC converter and a first DC/DC converter. The first connector is electrically connected to the electronic equipment via the Universal Serial Bus cable. The second connector is communicatively connected to the first connector and electrically connected to the portable device via the Universal Serial Bus cable, wherein a data transmission between the portable device and the electronic equipment mutually is via the signal transmission line, the first connector and the second connector. An input terminal of the first DC/DC converter is electrically connected to the electronic equipment via the power transmission line. An output terminal of the first DC/DC converter is electrically connected to the portable device via the power transmission line. The first DC/DC converter is applied to output stable voltage to the portable device, wherein the first connector is Universal Serial Bus 3.1 Power Delivery type C port, and electronic equipment can be either in a charged mode or in a power supplying mode via the Universal Serial Bus Power Delivery protocol.

In the described hub, further comprising a power converter and a third connector, the power converter is electrically connected to an AC source (mains) located in external environment via the third connector. The power converter includes an AC/DC converter and a second DC/DC converter. An input terminal of the AC/DC converter is electrically connected to the AC source via the third connector, and an input terminal of the second DC/DC converter is electrically connected to the output of AC/DC converter, and an output terminal of the second DC/DC converter is electrically connected to the portable devices. In addition, the hub further comprises a fourth connector, the fourth connector is electrically connected to an electronic equipment or a DC power source located in external environment. Wherein, in the hub, the fourth connector is electrically connected to an output terminal of the AC/DC converter and the input terminal of the second DC/DC converter.

In the described the hub, further comprising a current-sharing circuit, wherein the output terminal of the first DC/DC converter and the output terminal of the second DC/DC converter are electrically connected to the current-sharing circuit, and an output terminal of the current-sharing circuit is electrically connected to the portable devices. Or, the second DC/DC converter features with the function of constant current and constant voltage (CC-CV).

In the described the hub, further comprising a power controller and a current detector. The power controller is electrically connected to the first DC/DC converter, the current detector is electrically connected between the first DC/DC converter and the electronic equipment. An output voltage and an output current of the electronic equipment are detected by the power controller via the current detector. When the output voltage is less than a preset voltage value, or the output current is more than a preset current value, the output voltage of the first DC/DC converter is lowered by the power controller.

In the described hub, further comprising a first current detector, a third DC/DC converter, at least a fourth DC/DC converter, an energy storage, and an energy storage controlling circuit. The first current detector is electrically connected to the electronic equipment for detecting an output voltage and an output current of electronic equipment, and the third DC/DC converter is electrically connected to the first current detector. The fourth DC/DC converter is electrically connected to the third DC/DC converter, and converts the output voltage of the third DC/DC converter to a required and stable charging voltage for the portable devices. The energy storage is electrically connected between the third DC/DC converter and the fourth DC/DC converter. In addition, the energy storage controlling circuit is electrically connected to the electronic equipment, the first current detector, the third DC/DC converter, and the energy storage. The energy storage controlling circuit has a first preset current value and a first preset voltage value. Wherein, when the output current of the electronic equipment is less than the first preset current value, and the output voltage of the electronic equipment is more than the first preset voltage value, the output voltage of the third DC/DC converter is set to be more than an voltage of the energy storage by the energy storage controlling circuit so that both of the portable device and the energy storage can be charged by the electronic equipment. Otherwise, when the output current of the electronic equipment is more than the first preset current value or the output voltage of the electronic equipment is less than the first preset voltage value, the output voltage of the third DC/DC converter is reduced to be the voltage of the energy storage by the energy storage controlling circuit. With this method, the portable devices can be charged by both of the electronic equipment and the energy storage simultaneously.

In addition, the described hub further comprises a second current detector and a first switch. (The switch for example means MOSFET, BJT or other embodiments of transistor here.) Wherein, the second current detector and the first switch are electrically connected to each other, the second current detector is electrically connected to the energy storage controlling circuit and the node between the third DC/DC converter and the fourth DC/DC converter respectively, the first switch is electrically connected to the energy storage controlling circuit and the energy storage respectively. The second current detector is applied for detecting a charging current and a discharging current of the energy storage. When the charging current or the discharging current of the energy storage is more than a second preset current value, or when a charging voltage or a discharging voltage of the energy storage triggers a second preset voltage value, the first switch is not conducted (turn off).

In the described hub, the first connector is USB 3.1 PD (Power Delivery) type C port, and electronic equipment can be either in a charged mode or in a power supplying mode. Wherein, the hub further comprising a fifth DC/DC converter, a second switch, and a controlling circuit. The fifth DC/DC converter is electrically connected to the AC/DC converter, the second switch is electrically connected between the electronic equipment and the fifth DC/DC converter, and the second switch is electrically connected between the electronic equipment and the first DC/DC converter. The controlling circuit is electrically connected to the fifth DC/DC converter and the second switch. Wherein, the controlling circuit controls the second switch to enable or disable the electrical connection between the electronic equipment and the fifth DC/DC converter, and enable or disable the electrical connection between the electronic equipment and the first DC/DC converter. Wherein, when the third connector is not plugged to the AC source, the first connector is plugged to the electronic equipment, and when the fourth connector is not plugged to the electronic devices or the DC power, the controlling circuit controls the second switch to disable the electrical connection between the electronic equipment and the fifth DC/DC converter, and enable the electrical connection between the electronic equipment and the first DC/DC converter.

In addition, when the third connector is plugged to the AC source, and the first connector is plugged to the electronic equipment, the controlling circuit controls the second switch to enable the electrical connection between the electronic equipment and the fifth DC/DC converter, and disenable the electrical connection between the electronic equipment and the first DC/DC converter.

In addition, when the third connector is not plugged to the AC source, the first connector is plugged to the electronic equipment, and when the fourth connector is plugged to the DC power, the controlling circuit controls the second switch to enable the electrical connection between the electronic equipment and the fifth DC/DC converter, and disenable the electrical connection between the electronic equipment and the first DC/DC converter.

In the described hub, further comprising a third switch and a sixth DC/DC converter. The third switch is electrically connected between the AC/DC converter and the fifth DC/DC converter, and the sixth DC/DC converter is electrically connected between AC/DC converter and the fourth connector. Wherein, the sixth DC/DC converter is a boost converter and electrically connected to the second switch, the second DC/DC converter is buck converter and electrically connected to the second switch. When the first connector is plugged to the electronic equipment, and the third connector is plugged to the AC source and the fourth connector is open, or the third connector is open and the fourth connector is plugged to the DC power, there will be various voltage sources provided by different DC/DC converters standby at the second switch in the same time. After the controlling circuit communicates with the controller and electronic equipment, the required voltage source can be acknowledged. The controlling circuit controls the second switch to enable the electrical connection between the electronic equipment and the corresponding DC/DC converter, which is providing the required voltage source, and disenable the electrical connection between the electronic equipment and the first DC/DC converter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE INVENTION

Other features and advantages of the invention will be further understood from the further technological features disclosed by the embodiments of the invention wherein there are shown and described embodiments of this invention, simply by way of illustration of best modes to carry out the invention.

Figure 1:
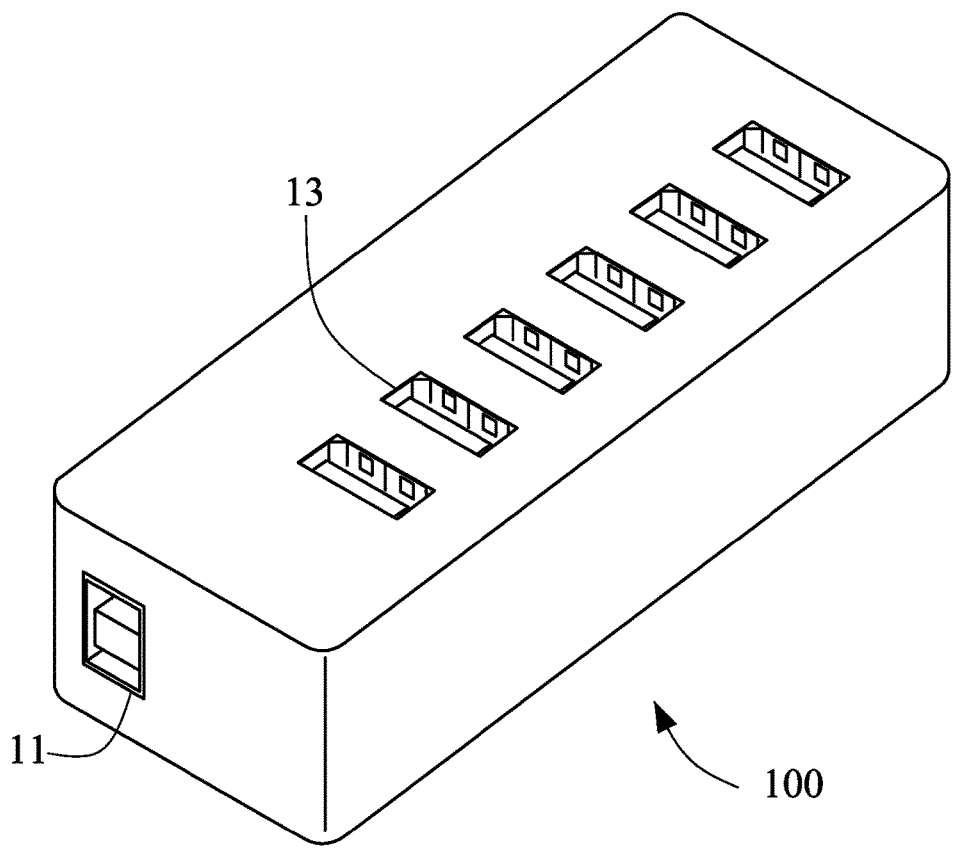
FIG. 1 is a schematic view illustrating the appearance of a hub according to a first embodiment of the present invention.
Figure 2A:
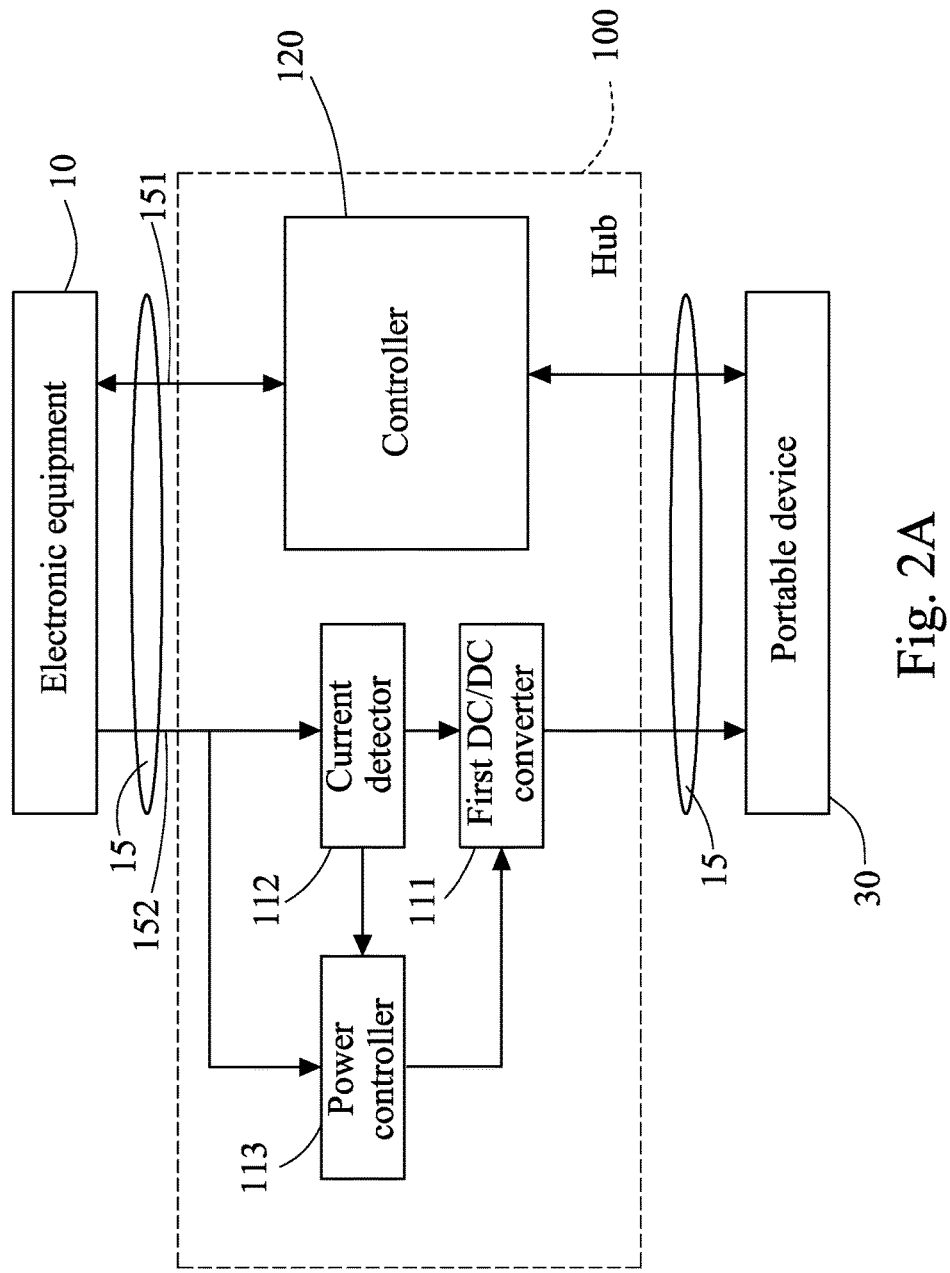
FIG. 2A is a schematic view illustrating the configuration of a hub according to the first embodiment.

Referring to FIG. 1 and. 2A, FIG. 1 is a schematic view illustrating the appearance of a hub according to a first embodiment of the present invention, FIG. 2A is a schematic view illustrating the configuration of a hub according to the first embodiment. The hub 100 includes a first connector 11 and at least a second connector 13 (in the present embodiment, the hub 100 includes a plurality of the second connectors). In the present embodiment, the first connector 11 and the second connector 13 are USB ports. The hub 100 is electrically connected to an USB port of electronic equipment 10 via the first connector 11 and an USB cable 15. The electronic equipment 10 is, for example, an AIO (All in one) PC, a desktop computer, or a notebook computer. The second connector 13 is used to make the hub 100 connect to at least a portable device 30 electrically. The portable device 30 is, for example, a mobile phone, a tablet PC, a Card Reader or a storage device etc. The electronic equipment 10 is electrically connected to multiple portable devices 30 via USB cable 15 and the hub 100 for executing processes of data transmission or quick charging. In addition, the interior of the hub 100 includes a controller 120, the controller 120 is electrically connected between the electronic equipment 10 and the portable device 30. In the present embodiment, a signal transmission line 151 of USB cable 15 is electrically connected to the controller 120. Thus, the controller 120 is suitable for having data transmission with the portable device 30 mutually, and a data transmission path is constructed between the electronic equipment 10 and the portable device 30.

A signal can be transmitted to the portable device 30 by the controller 120, and a rapid charge mode can be enabled when the portable device 30 receives the signal. In detail, the definitions of current USB port are: Standard Downstream Port (SDP), Dedicated Charging Port (DCP), and Charging Downstream Port (CDP). SDP is used in data transmission mainly. The charging current of SDP is only 500 mA, and has a slower charging speed. DCP is a specific definition for charging, and the maximum possible charging current can reach to 1500 mA or more, but can't provide a data transmission. CDP can execute a data transmission, has a maximum charging current of 1500 mA. The signal transmitted from the controller 120 can make the portable device 30 enable a charging mode for CDP so that be with rapid charge and data transmission simultaneously. In addition, the controller 120 also can just make the portable device 30 enable the DCP mode according to the situation. For example, when the hub 100 is not electrically connected to the USB port of the electronic device, but electrically connected to a voltage source without the function of data transmission (such as a power bank or a mains electricity), the controller 120 can make the portable device 30 enable the DCP mode. Besides, in the construction of the USB type C, the equipment end has a communication with the device end to decide the charging mode or supply mode, wherein the current can be 5V/1.5 A or 5V/3 A, or even Power Delivery mode (12V or 20V).

In addition, the hub 100 further comprises a first DC/DC converter 111, wherein an input terminal of the first DC/DC converter 111 is electrically connected to electronic equipment 10 via a power transmission line 152 of USB cable 15, and an output terminal of the first DC/DC converter 111 is electrically connected to the portable device 30 via power transmission line 152 of USB cable 15. The first DC/DC converter 111 is a DC/DC converter with threshold current or threshold voltage, and can adjust the output voltage to stabilize the charging voltage of the portable device 30. The charging voltage received by the portable device 30 is adjusted via DC/DC converter 111 and can be supplied stably regardless of the power status of the electronic equipment 10 and losses in power transmission line. This is, the first DC/DC converter 111 has the function of regulation.

Please continue to refer FIG. 2A, when more portable devices 30 are electrically connected to the hub 100 and need more charging current, the output current of the electronic equipment 10 will increase, and the output voltage of the electronic equipment 10 will be lower due to the connection loss, the line loss, or other factors. When the output current of the electronic equipment 10 exceeds a predetermined current value, the electronic equipment 10 will be overloaded. Thus, in the present embodiment, by integration of the first DC/DC converter 111, the current detector 112, and the power controller 113, so that the output power of the electronic equipment 10 can be limited. Therefore, the electronic equipment 10 will not be overloaded in the status which the portable device 30 need excessive charging current. In addition, the voltage outputted by the first DC/DC converter 111 can be stabilized to meet the charging demand of the portable device 30. In the present embodiment, the output voltage or the output current of the electronic equipment 10 can be detected by the power controller 113 via the current detector 112. A preset voltage value and a second preset current value are saved in the power controller 113. When the output voltage of the electronic equipment 10 detected by the power controller 113 is less than the preset voltage value, or the output current of the electronic equipment 10 is more than the second preset current value, the first DC/DC converter 111 will be controlled by the power controller 113 to lower the output voltage immediately. By limiting the output voltage of the electronic device 10 not less than preset voltage value and the output current of the electronic device 10 not exceed the second preset current value, the output power of the hub 100 can be limited for preventing the damage of the electronic equipment 10 resulted from the exceed charging current of the portable device 30. In the present embodiment, the current detector 112 and the power controller 113 are applied to control the output voltage and the output current of the first DC/DC converter 111, but not limit to. In some embodiments, the current detector 112 and the power controller 113 are not applied, and the portable device 30 can be supplied with stable voltage by the first DC/DC converter 111 directly.

Figure 2B:
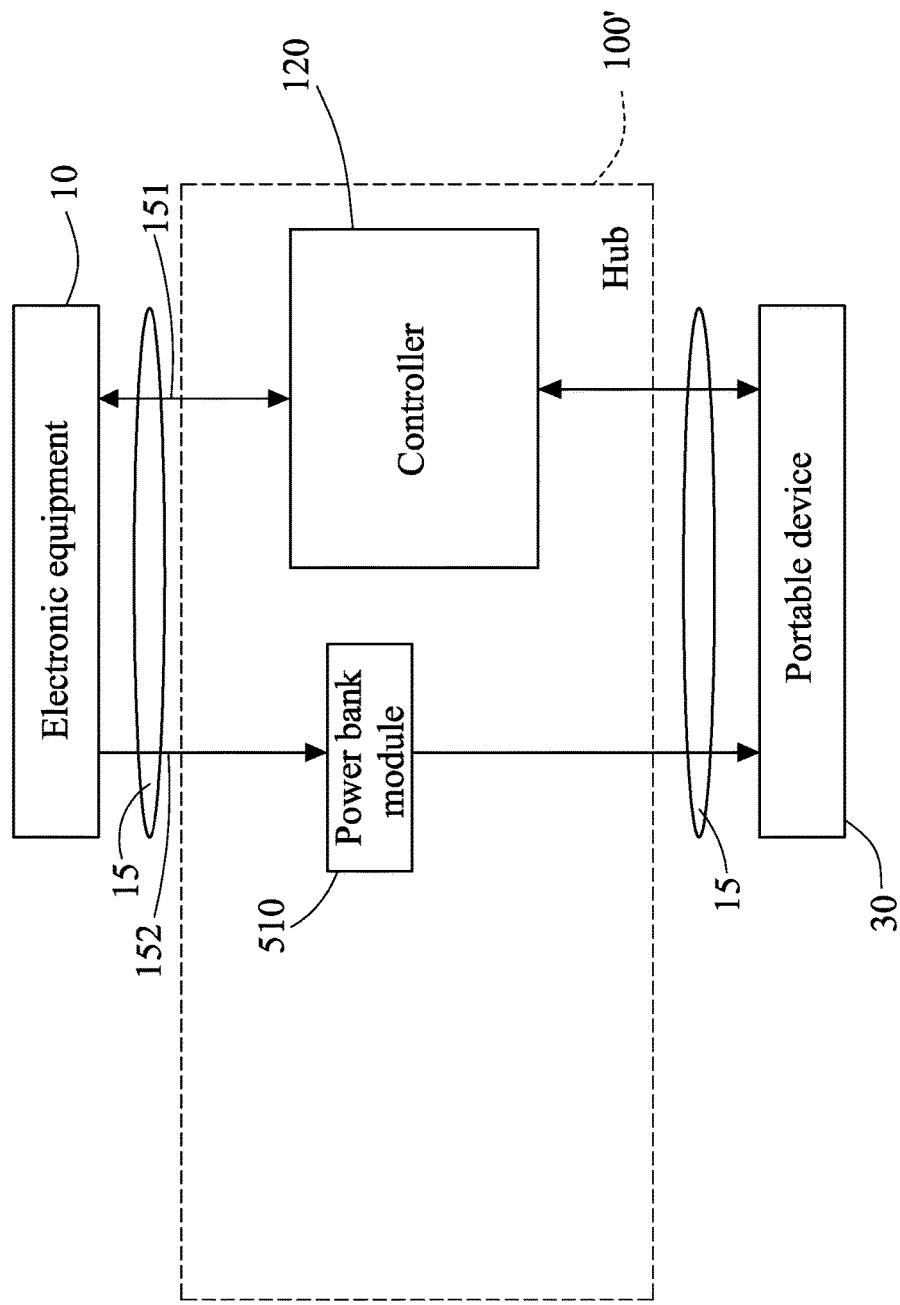
FIG. 2B is a schematic view illustrating the configuration of a hub according to another embodiment.
Figure 8:
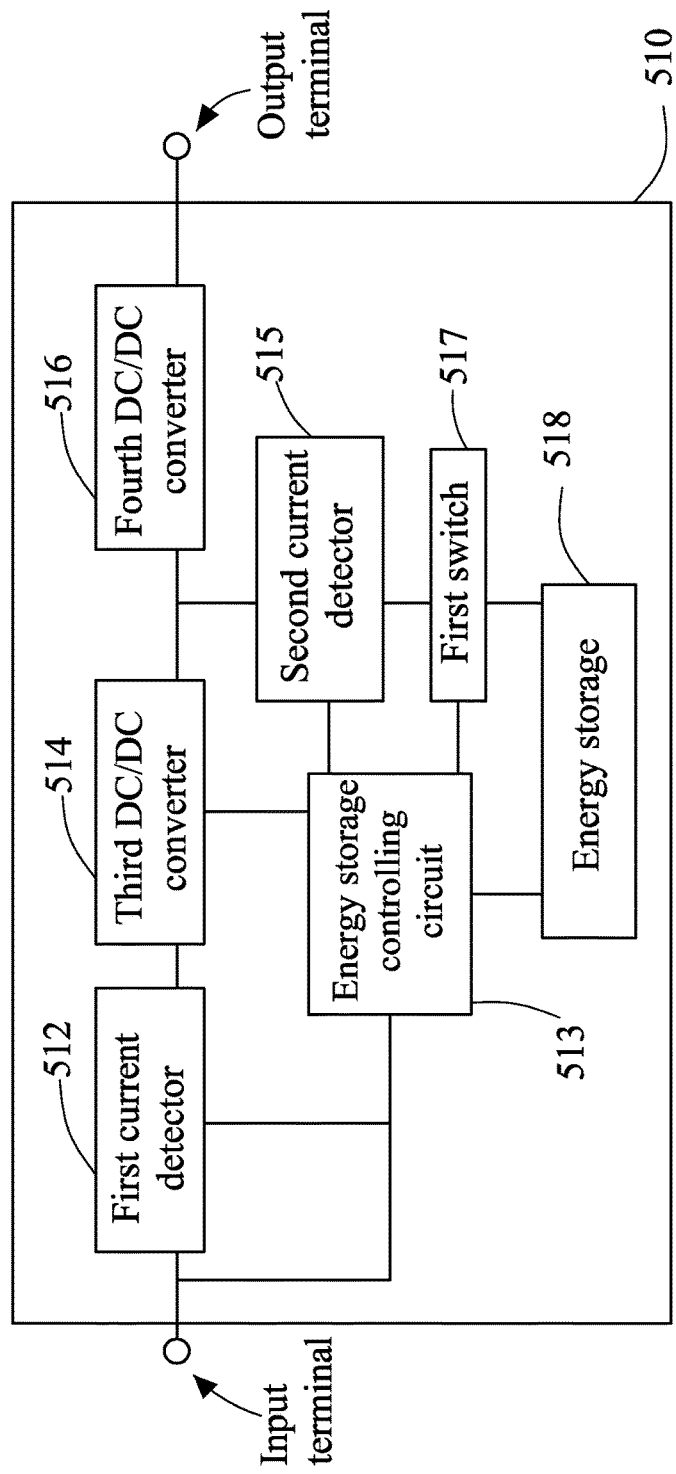
FIG. 8 is a schematic view illustrating the configuration of the power bank module according to the present invention.

In addition, a power bank module can be configured in the hub, and then a hub with function of the power bank module can be provided. Referring to FIG. 2B and FIG. 8, wherein FIG. 2B is a schematic view illustrating the configuration of a hub according to another embodiment and FIG. 8 is a schematic view illustrating the configuration of the power bank module according to the present invention. The power bank module 510 includes a first current detector 512, a third DC/DC converter 514, a fourth DC/DC converter 516, an energy storage controlling circuit 513, and an energy storage 518. The first current detector 512 is electrically connected to the electronic equipment 10 for detecting the output voltage and output current of the electronic equipment 10. The third DC/DC converter 514 is electrically connected to the first current detector 512. The energy storage 518 is, for example, a battery, electrically connected between the third DC/DC converter 514 and the fourth DC/DC converter 516. The fourth DC/DC converter 516 is electrically connected to the third DC/DC converter 514. The output voltage of third DC/DC converter 514 and the voltage of the energy storage 518 can be converted to the required charging voltage of the portable device 30 by the fourth DC/DC converter 516. The energy storage controlling circuit 513 is electrically connected to the first current detector 512, the third DC/DC converter 514, the electronic equipment 10, and the energy storage 518 respectively. The output current and the output voltage of the electronic equipment 10 can be detected by the energy storage controlling circuit 513 via the first current detector 512. Therefore, the energy storage controlling circuit 513 saves a first preset current value and a first preset voltage value. The output current or the output voltage of the electronic equipment 10 can be compared with the first preset current value or the first preset voltage value by the energy storage controlling circuit 513, and which be the basis for controlling the output voltage of the third DC/DC converter 514.

The output current and the output voltage of the electronic equipment 10 are detected by the energy storage controlling circuit 513. When the output current of the electronic equipment 10 is less than the first preset current value, and the output voltage of the electronic equipment 10 is more than the first preset voltage value, the output voltage of the third DC/DC converter 514 is a little higher than the voltage of the energy storage 518. The energy storage controlling circuit 513 will control the third DC/DC converter 514 to output current with the first preset current value, and the energy storage 518 and the portable device 30 can be charged simultaneously, wherein the third DC/DC converter 514 will be in the constant current mode for power supplying. In addition, the output voltage of the third DC/DC converter 514 is converted to the required charging voltage of the portable device 30 by the fourth DC/DC converter 516 for charging the portable device 30 stably. When the energy storage 518 is close to the fully charged state, and the total required charging current of the portable device 30 and the energy storage 518 is less than the first preset current value, the energy storage controlling circuit 513 will control the output voltage of the third DC/DC converter 514 in a preset value, wherein the preset value is only slightly higher than the voltage of the fully charged energy storage 518, such as 4.3V. Thus, the third DC/DC converter 514 can be in the constant voltage mode for power supplying to the energy storage 518 and the portable device 30.

When the amount of the portable devices 30 becomes more and need to be charged simultaneously, the required charging current of the portable devices 30 will be raised. When the required charging current of the portable devices 30 is raised and leading to the output current of the electronic equipment 10 more than the first preset current value or the output voltage of the electronic equipment 10 less than the first preset voltage value, the third DC/DC converter 514 will transfer to the constant current mode immediately and output current within the first preset current value for power supplying. At this time, the output voltage of the third DC/DC converter 514 will drop. When the output voltage of the third DC/DC converter 514 drops and then equals to the voltage of the energy storage 518, the power delivery of the energy storage 518 can be started. Then, the portable device 30 can be charged by both of the electronic equipment 10 and the energy storage 518 simultaneously via the fourth DC/DC converter 516, and meet the demand of higher charging current for lots of the portable device 30.

Besides, the power bank module 510 of the present embodiment further comprises a second current detector 515 and a first switch 517. The second current detector 515 and the first switch 517 are applied to protect the energy storage 518 and prevent the energy storage 518 from aging and result in abnormal charge and discharge. The second current detector 515 and the first switch 517 are electrically connected to each other. The second current detector 515 is electrically connected to the energy storage controlling circuit 513 and the node between the third DC/DC converter 514 and the fourth DC/DC converter 516 respectively. The first switch 517 is electrically connected to the energy storage controlling circuit 513 and the energy storage 518 respectively. The voltage of the energy storage 518 can be detected by the energy storage controlling circuit 513. The charging current and the discharging current of the energy storage 518 can be detected by the energy storage controlling circuit 513 via the second current detector 515, and control the first switch 517 to protect the energy storage 518. The controlling circuit further comprises a second preset current value and a second preset voltage value. When the charging current or the discharging current of the energy storage 518 is more than the second preset current value, or the voltage of the energy storage 518 is over than the second preset voltage value (the energy storage 518 be in a status of overcharging or over-discharging), the energy storage controlling circuit 513 will let the first switch 517 not be in a status of conduction (or open-circuited) for protecting the energy storage 518.

Figure 3A:
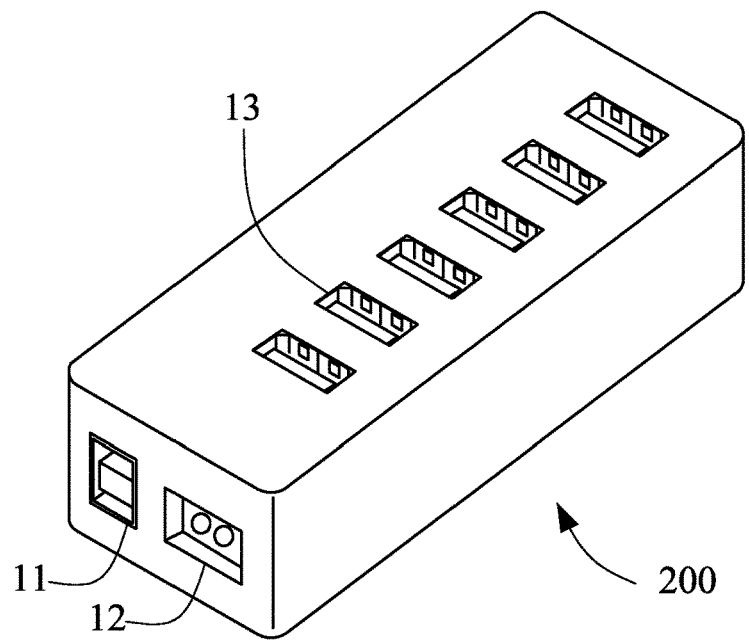
FIG. 3A and FIG. 3B are schematic views illustrating the appearance of a hub according to a second embodiment of the present invention.
Figure 3B:
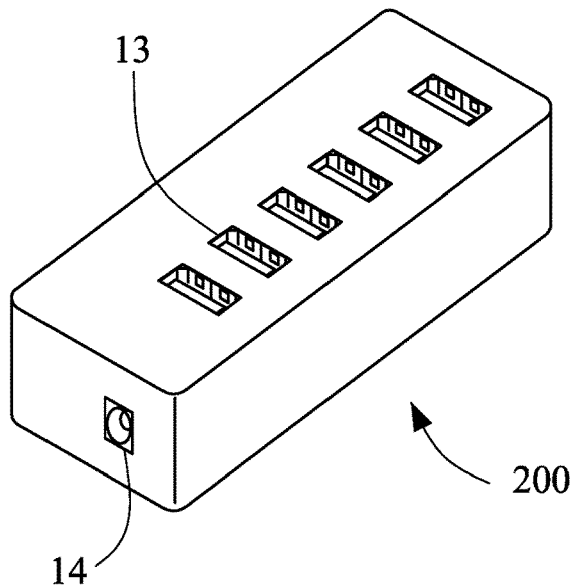
Figure 4:
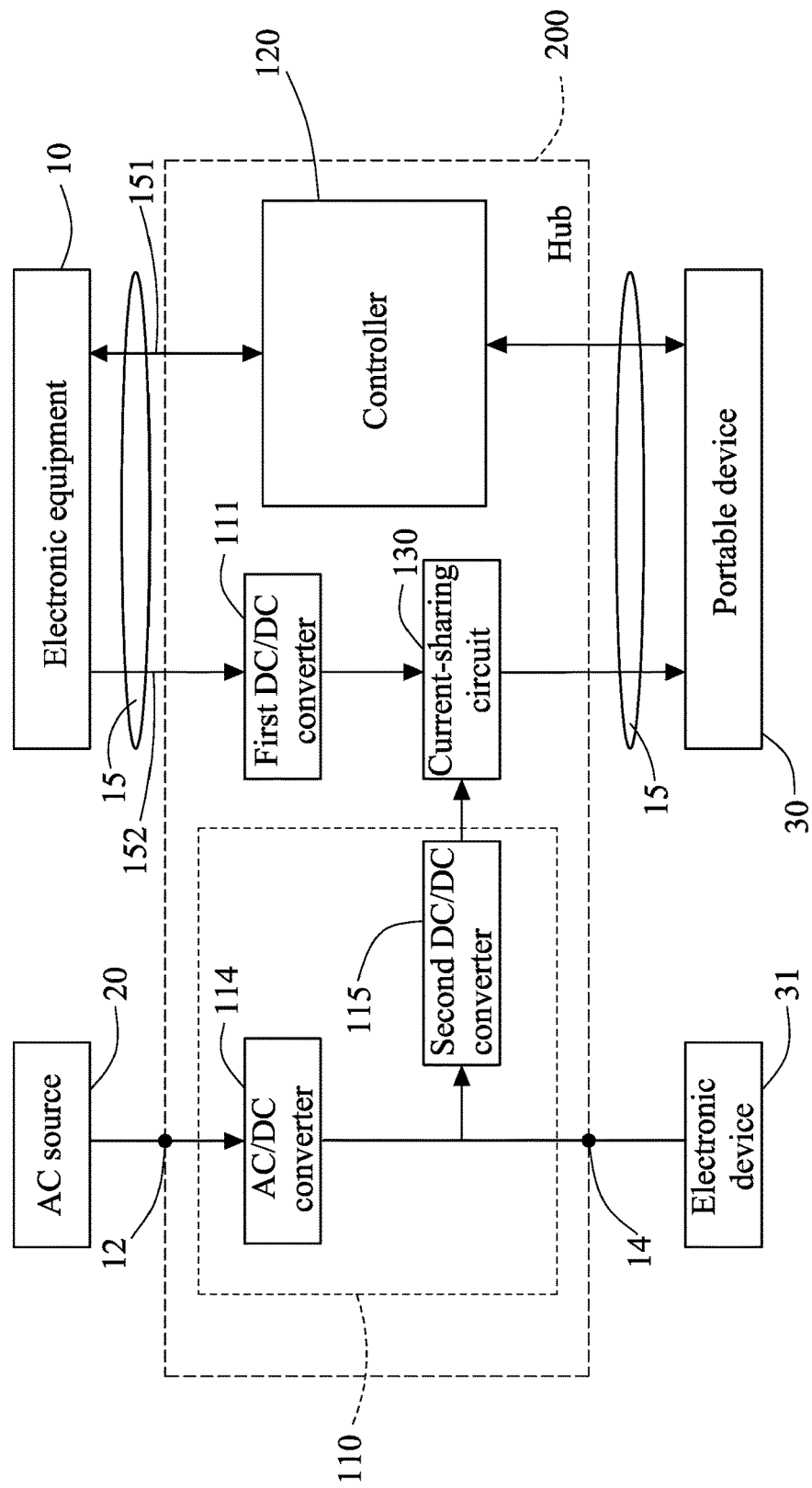
FIG. 4 is a schematic view illustrating the configuration of a hub according to the second embodiment.

Referring to FIG. 3A, FIG. 3B and FIG. 4, FIG. 3A and FIG. 3B are schematic views illustrating the appearance of a hub according to a second embodiment of the present invention, FIG. 4 is a schematic view illustrating the configuration of a hub according to the second embodiment. In addition to the first connector 11 and the second connector 13, the hub 200 further comprises a third connector 12 and a fourth connector 14. Furthermore, the interior of the hub 200 further comprises a power converter 110, the power converter 110 is electrically connected to an AC source 20 located in external environment via are third connector 12, The AC source 20 is, for example, 110V household outlet (mains). The power converter 110 includes an AC/DC converter 114 and a second DC/DC converter 115, The input terminal of the AC/DC converter 114 is electrically connected to the AC source 20 via the third connector 12, and the input terminal of the second DC/DC converter 115 is electrically connected to the output terminal of the AC/DC converter 114, and the output terminal of the second DC/DC converter 115 is electrically connected to a current-sharing circuit 130, and the output terminal of the current-sharing circuit 130 is electrically connected to the portable device 30.

Besides, the fourth connector 14 of the hub 200 is electrically connected to at least an electronic device 31 with different voltage levels which are not the same with the voltage of the portable device 30. The electronic devices 31 are, for example, tablet PCs, notebook computers, AIO PCs. When the amount of the portable device 30 and the electronic devices 31 electrically connected by the hub 200 become more and more, the required charging power becomes higher. At this time, the additional power supplying can be provided by the AC source 20, and both of the portable device 30 and the electronic devices 31 can be charged by the hub 100. In addition, by extending the signal transmission line 151 to the portable device 30, all the data transmission between the electronic equipment 10, the portable device 30, and the electronic devices 31 can be performed optionally in the hub 200.

In addition, the second DC/DC converter 115 can be with the function of constant current and constant voltage (CC-CV). The input terminal of the second DC/DC converter 115 is electrically connected to the AC/DC converter 114, the output terminal of the second DC/DC converter 115 is electrically connected to the output terminal of the first DC/DC converter 111, and the output terminal of the second DC/DC converter 115 and the output terminal of the first DC/DC converter 111 are electrically connected to the portable device 30. The second DC/DC converter 115 includes a third preset current value. When the required input current of the portable device 30 is lower than the third preset current value, the output voltage of the second DC/DC converter 115 is set in a predetermined value constantly. When the required input current of the portable device 30 is higher than the third preset current value, the output voltage of the second DC/DC converter 115 will drop.

When the required charging current of the portable device 30 is less than the third preset current value, the output voltage of the second DC/DC converter 115 is set in the predetermined value constantly, and has a power supplying in a constant voltage mode at this time. Wherein, the predetermined voltage is higher than the output voltage of the first DC/DC converter 111 so that the output terminal of the first DC/DC converter 111 is in a status of reverse bias voltage. Thus, the portable device 30 doesn't derive power from the electronic equipment 10 at this time, but the AC source 20.

When the amount of the portable devices 30 electrically connecting to the hub 100 increases and the portable devices 30 are charged simultaneously, the required charging current of all portable devices 30 will be raised. When the required charging current of the portable devices 30 is more than the third preset current value, the second DC/DC converter 115 will be in the constant current mode at this time under the control of CC-CV function. In the status that the output current of the second DC/DC converter 115 is limited, and the output voltage of the second DC/DC converter 115 will be lowered immediately. When the output voltage of the second DC/DC converter 115 drops and then equal to the output voltage of the DC/DC converter 111, the electronic equipment 10 will supply power to the portable device 30. At this time, the portable devices 30 are charged by both of the electronic equipment 10 and the second voltage source 20 simultaneously, and meet the demand of higher charging current for the portable devices 30.

Figure 4A:
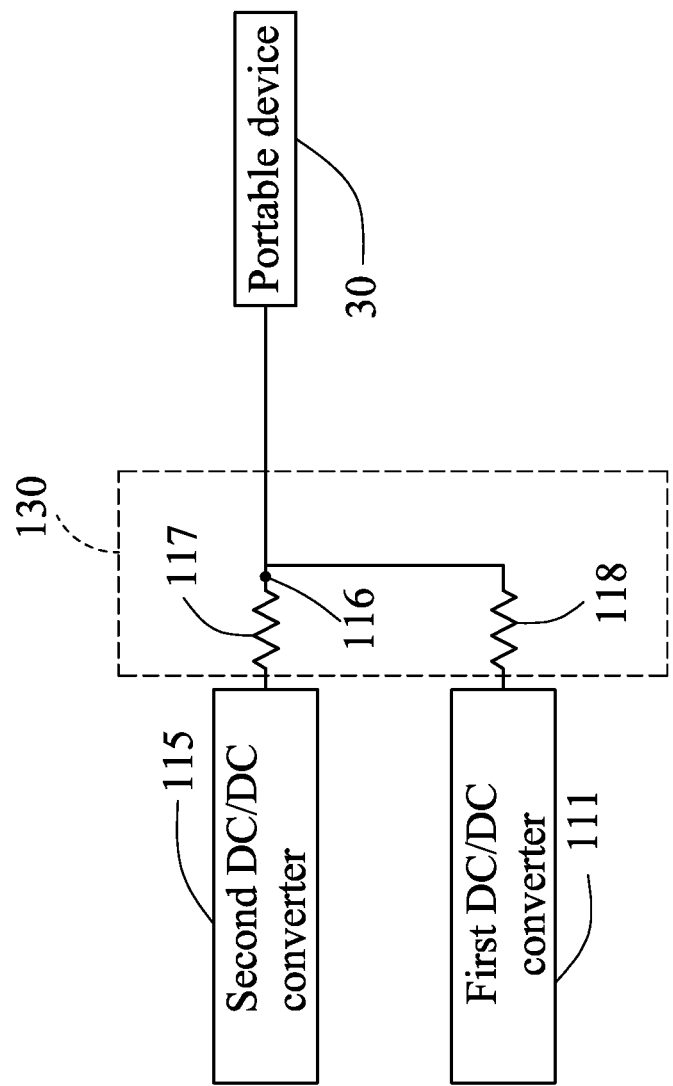
FIG. 4A is a schematic view illustrating the configuration of a current-sharing circuit.

Or, the second DC/DC converter 115 being not likely with the function of constant current and constant voltage (CC-CV), the current-sharing circuit 130 can be applied to have the described function. Please refer to FIG. 4A simultaneously, the output terminal of the first DC/DC converter 111 and the output terminal of the second DC/DC converter 115 are electrically connected to the current-sharing circuit 130. As shown in FIG. 4A, the current-sharing circuit 130 is, for example, constituted by resistors 117, 118, wherein the output terminal of the second DC/DC converter 115 is electrically connected to the resistor 117, and the output terminal of the first DC/DC converter 111 is electrically connected to the resistor 118. When the required current of the portable devices 30 increases, the voltage drop of the resistor 117 will be increased and make the voltage of the node 116 drop. When the required current of the portable devices 30 flows through the resistor 117, and make the voltage of the node 116 drop and lower than the output voltage of the DC/DC converter 111, the power delivery of the DC/DC converter 111 will be started. This can reach the effects which the portable devices 30 can be charged by both of the electronic equipment 10 and the second voltage source 20 simultaneously.

Figure 5:
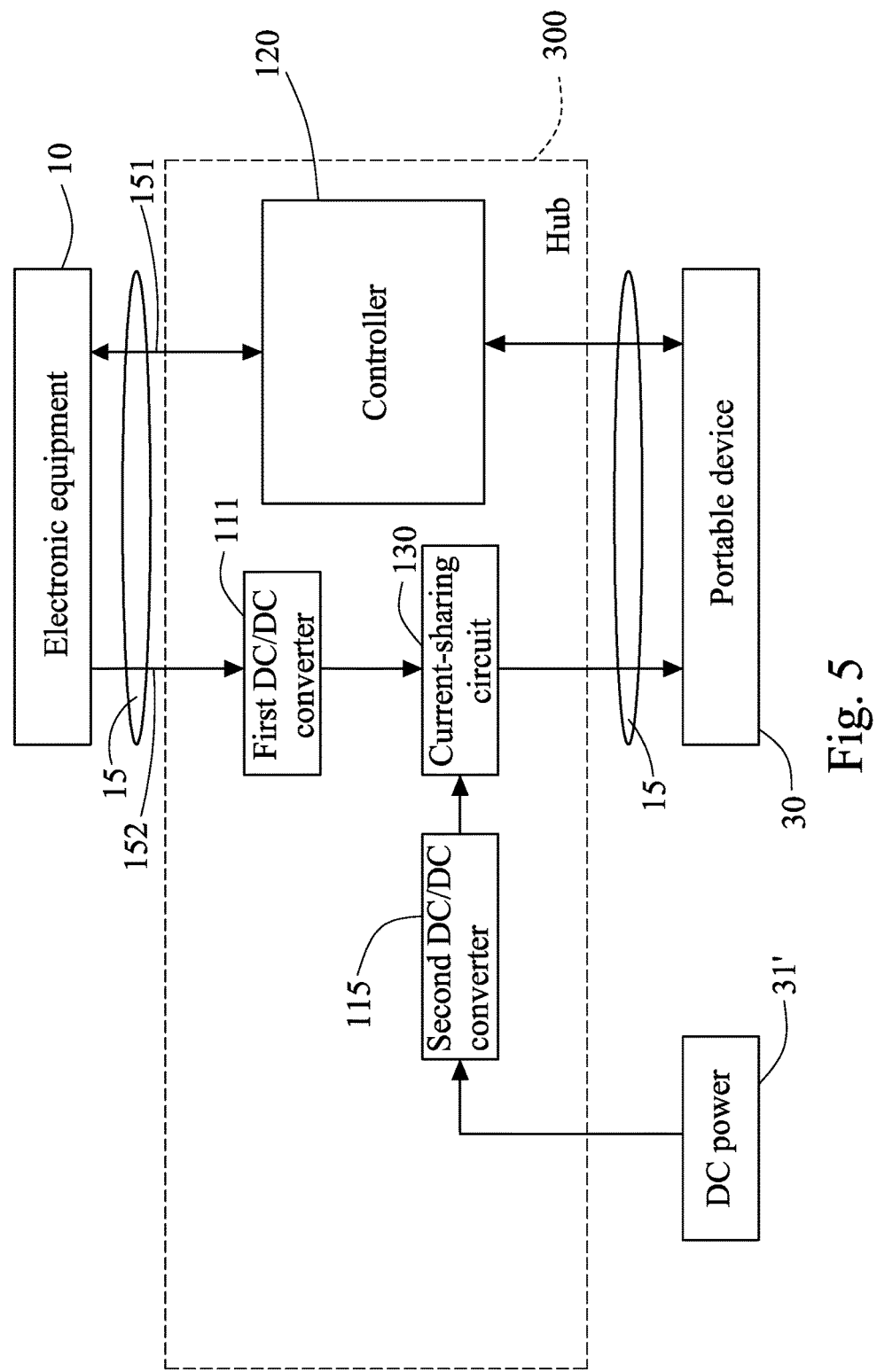
FIG. 5 is a schematic view illustrating the configuration of a hub according a third embodiment.

Furthermore, referring to FIG. 5, FIG. 5 is a schematic view illustrating the configuration of a hub according to a third embodiment. Compared to the hub 200 of the second embodiment, the hub 300 does not include the AC/DC converter 114. Wherein, the fourth connector 14 is electrically connected to an external DC power 31', the DC power 31' is, for example, a charging dock from car battery, which the output voltage of the car charging dock is about 12V or 24V. Thus, the power can be supplied to the portable device 30 via second DC/DC converter 115 between the DC power 31'.

Figure 6:
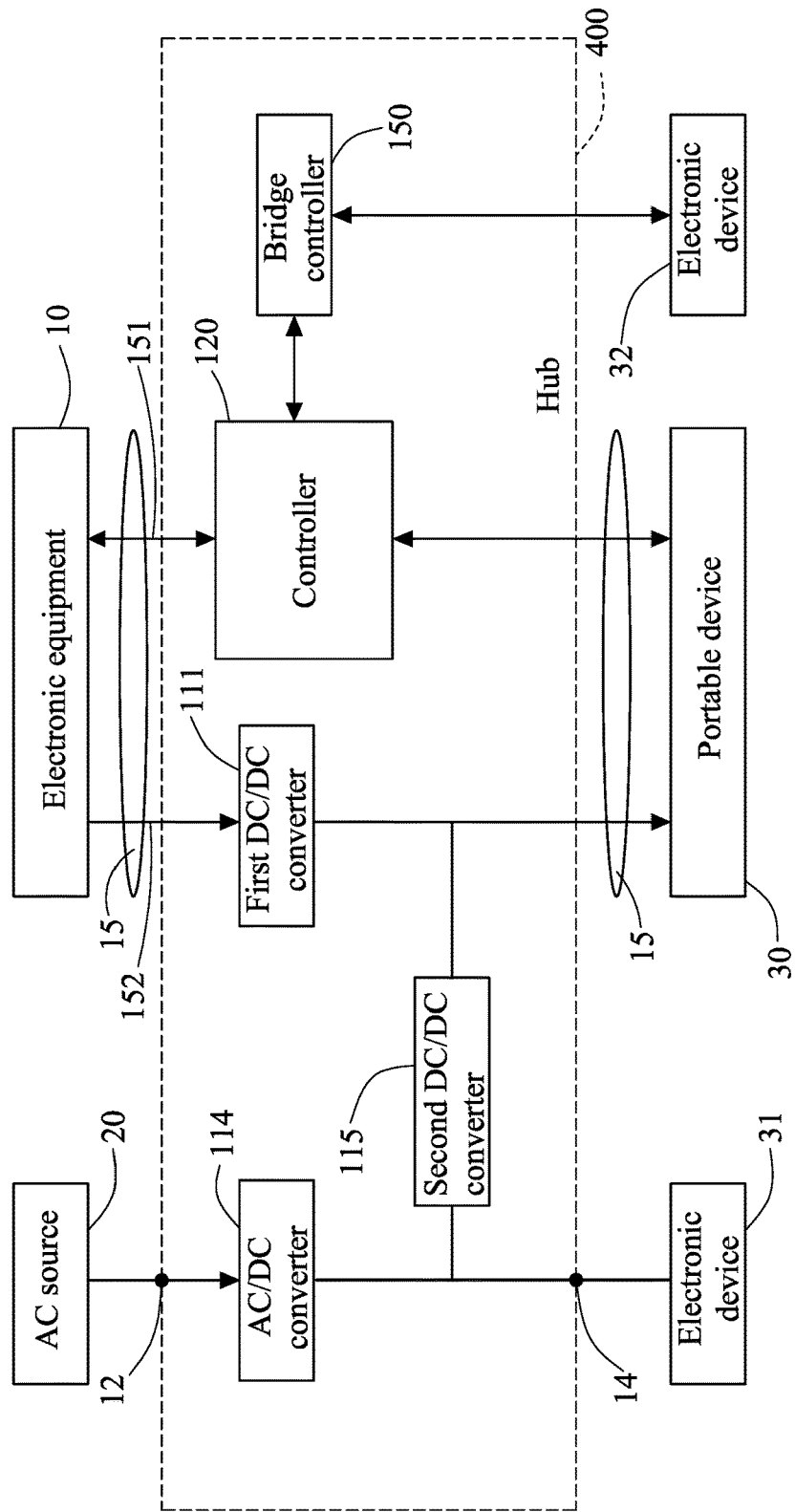
FIG. 6 is a schematic view illustrating the configuration of a hub according to a fourth embodiment.

Referring to FIG. 6, FIG. 6 is a schematic view illustrating the configuration of a hub according to a fourth embodiment. Compared to the hub 200 shown in FIG. 4, the hub 400 further comprises a bridge controller 150. The bridge controller 150 is electrically connected to the controller 120, and the bridge controller 150 is applied to perform a data format conversion. For example, the bridge controller 150 can convert the signal outputted from the controller 120 to be other signal format, and transmit these signals to other electronic devices 32, like a card reader, a VGA port, or a HDMI port, or even a memory (the memory can be located in the hub), etc. Therefore, the docking station can be applied in the hub 400 additionally. In other words, the hub 400 can be charged and have a data transmission and a data conversion simultaneously. Certainly, the hub 400 can be simply a charger only. In addition, by extending the signal transmission line 151 to the portable device 30, all the data transmission between the electronic equipment 10, the portable device 30, and the electronic devices 31, 32 can be performed optionally in the hub 400.

Figure 7:
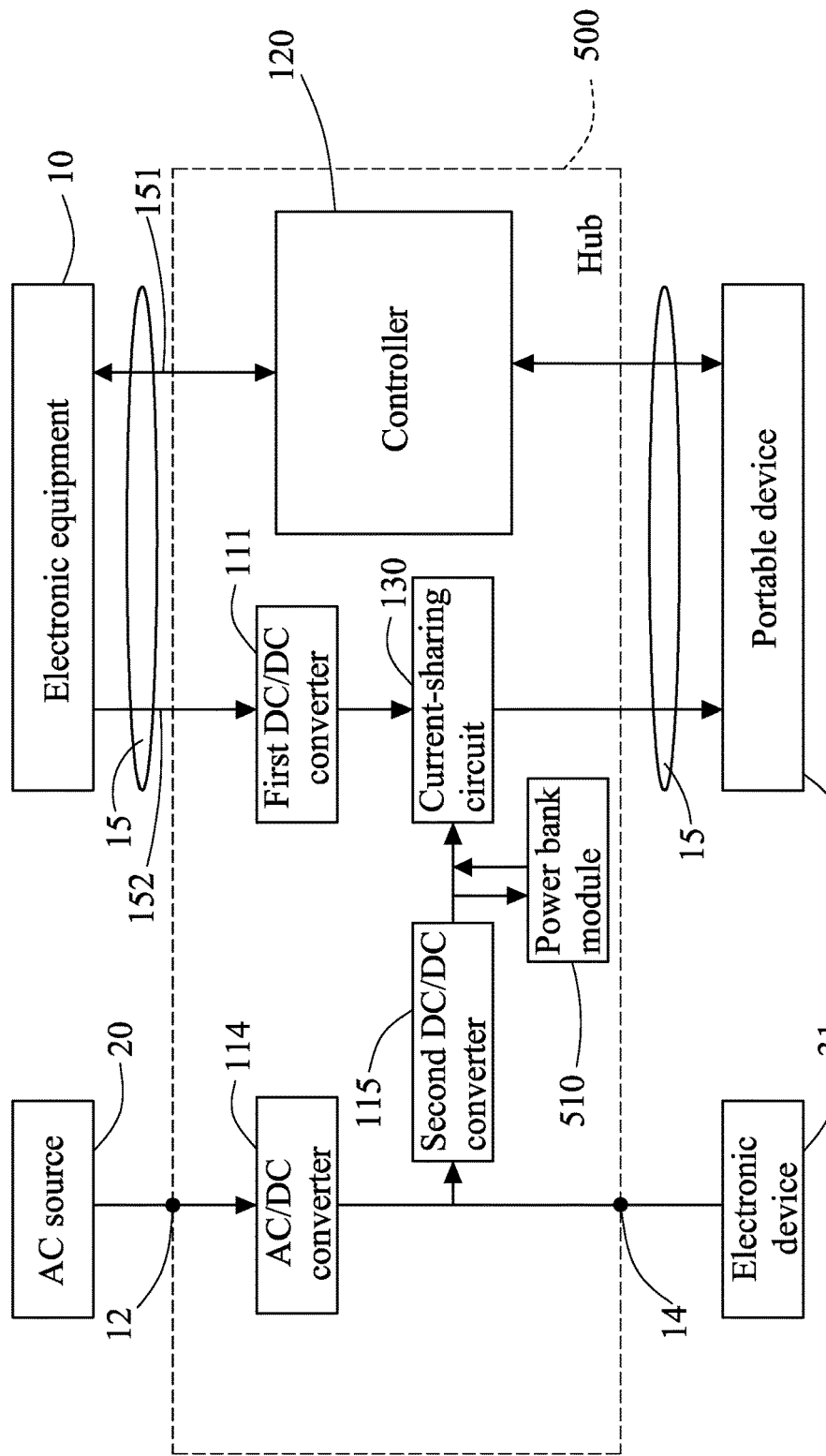
FIG. 7 is a schematic view illustrating the configuration of a hub according to a fifth embodiment.

Referring to FIG. 7 and. 8, FIG. 7 is a schematic view illustrating the configuration of a hub according to a fifth embodiment, FIG. 8 is a schematic view illustrating the configuration of the power bank module according to the present invention. In the fifth embodiment, the power bank module 510 is further configured between the second DC/DC converter 115 and the current-sharing circuit 130. Wherein the input terminal of the power bank module 510 is electrically connected to the second DC/DC converter 115, and the output terminal of the power bank module 510 is electrically connected to the current-sharing circuit 130. Furthermore, the the power bank module 510 can also be located between the second DC/DC converter 115 and the current-sharing circuit 130.

Figure 9:
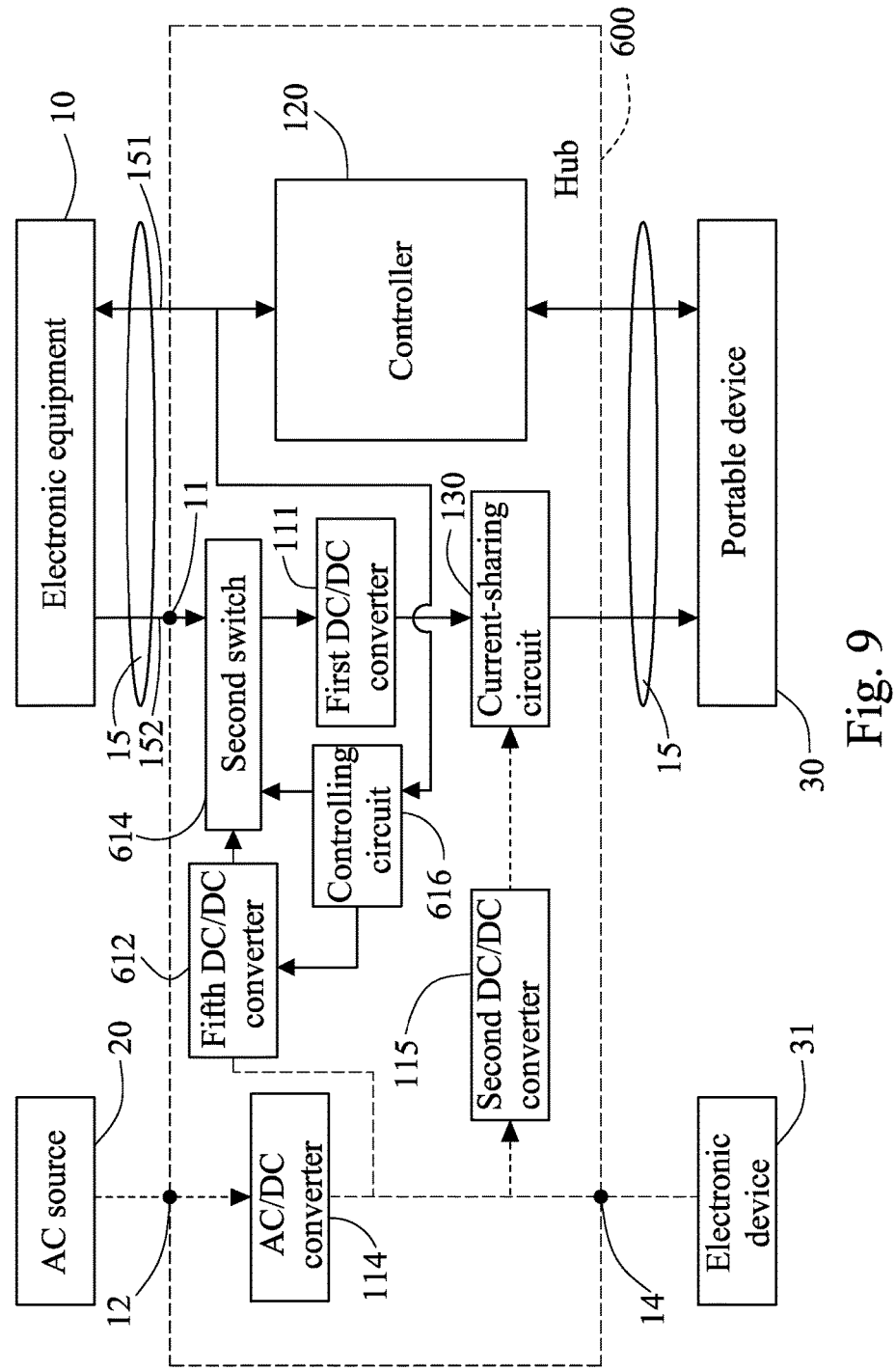
FIG. 9 is a schematic view illustrating the configuration of a hub according to a fifth embodiment.

Referring to FIG. 9, FIG. 9 is a schematic view illustrating the configuration of a hub according to a fifth embodiment. Compared to the hub 200 shown in FIG. 4, the hub 600 further comprises a fifth DC/DC converter 612, a second switch 614, and a controlling circuit 616. Besides, the first connector 11 is, for example, USB 3.1 PD (Power Delivery) type C port. Wherein, the electronic equipment 10 can be in a charging mode or a power supplying mode via the communicating procedures of the controller 120 (The electronic equipment 10 such as tablet PCs, notebook computers, AIO PC, TV, Monitor etc.). Wherein, the fifth DC/DC converter 612 is electrically connected to the AC/DC converter 114, the second switch 614 is electrically connected between the electronic equipment 10 and the fifth DC/DC converter 612, and the second switch 614 is electrically connected between the electronic equipment 10 and the first DC/DC converter 111. Besides, the output terminal of the controlling circuit 616 is electrically connected to the fifth DC/DC converter 612 and the second switch 614, and the input terminal of the controlling circuit 616 is electrically connected to the electronic equipment 10 by the signal transmission line 151. The controlling circuit 616 is applied to control the second switch 614 for enabling or disabling the electrical connection between the electronic equipment 10 and the fifth DC/DC converter 612. Besides, a communication exists between the electronic equipment 10, the controlling circuit 616, and the controller 120, the required voltage level of the electronic equipment 10 will be determined. Then, with the second switch 614 controlling by the controlling circuit 616, the electrical connection between the electronic equipment 10 and the first DC/DC converter 111 can be enabled or disabled. In the present embodiment, the input terminal of the controlling circuit 616 is electrically connected to the signal transmission line 151 directly. In addition, the input terminal of the controlling circuit 616 also can electrically connect to the controller 120 firstly, and then electrically connect to the signal transmission line 151. In detail, when the controlling circuit 616 features handshaking function for the required voltage level of the electronic equipment 10, the controlling circuit 616 can electrically connect to the signal transmission line 151 directly; Otherwise, when the controlling circuit 616 doesn't feature handshaking function for the required voltage level of the electronic equipment 10, the controlling circuit 616 can electrically connect to the controller 120, and the controller 120 featuring with handshaking function negotiates the required voltage level of the electronic equipment 10.

Please continue to refer FIG. 9, when the third connector 12 is not electrically connected to AC source 20, and the fourth connector 15 is also not electrically connected to the DC power 31' as shown in FIG. 5 (the electrical non-connection is represented by dotted line in FIG. 9), the first connector 11 is electrically connected to the electronic equipment 10. At this time, the controlling circuit 616 controls the second switch 614 to disable the electrical connection between the electronic equipment 10 and the fifth DC/DC converter 612, and enable the electrical connection between the electronic equipment 10 and the first DC/DC converter 111. In this status, the portable device 30 derives power from the electronic equipment 10.

Figure 10:
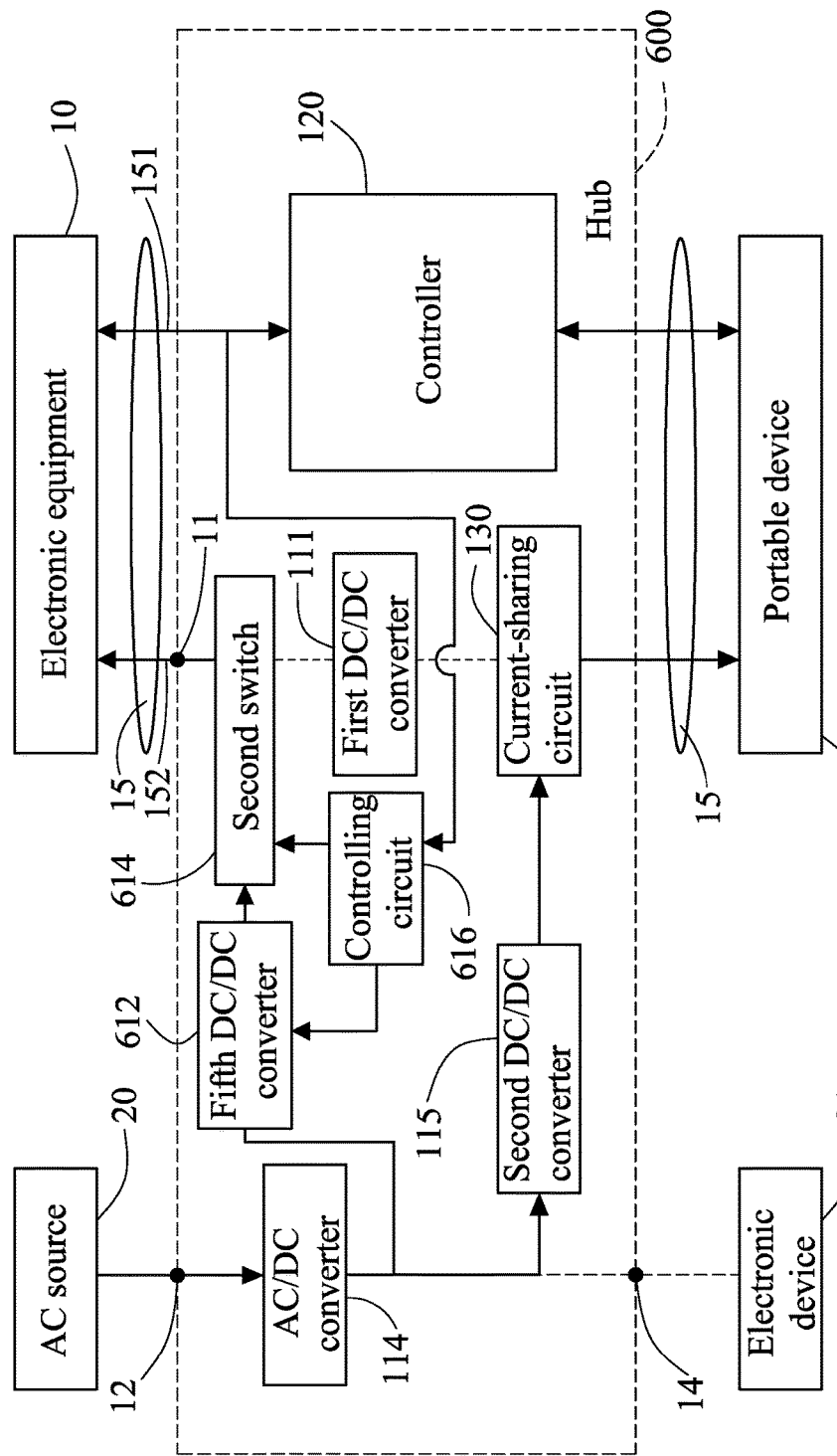
FIG. 10 is a schematic view illustrating another operational status of a hub according to the fifth embodiment.

Referring to FIG. 10, FIG. 10 is a schematic view illustrating another operational status of a hub according to the fifth embodiment. When the third connector 12 is electrically connected to the AC source 20, the first connector 11 is electrically connected to the electronic equipment 10, and the fourth connector 14 is not electrically connected to the electronic device 31, the controlling circuit 616 can control the second switch 614 to enable the electrical connection between the electronic equipment 10 and the fifth DC/DC converter 612, and disenable the electrical connection between the electronic equipment 10 and the first DC/DC converter 111. In this status, the electronic equipment 10 also can be transferred to a power receiving end via the signal communications, such as via the USB PD protocol, to ask the fifth DC/DC converter 612 to adjust output voltage, and make the AC source 20 (through power converter 114) charge the electronic equipment 10. Therefore, the AC source 20 can not only charge the portable device 30, but also charge the electronic equipment 10. Besides, if the device electrically connected by the fourth connector 14 is the electronic device 31, the AC source 20 can charge the electronic device 31 and the portable device 30 simultaneously.

Referring to FIG. 9 and FIG. 10, when the AC source 20 is not inserted into the hub 200 and without having a power supplying, the electronic equipment 10 can be as a power supplying end; when the AC source 20 is inserted into the hub 200, the electronic equipment 10 can be transferred to be the power receiving end for being charged.

Figure 11:
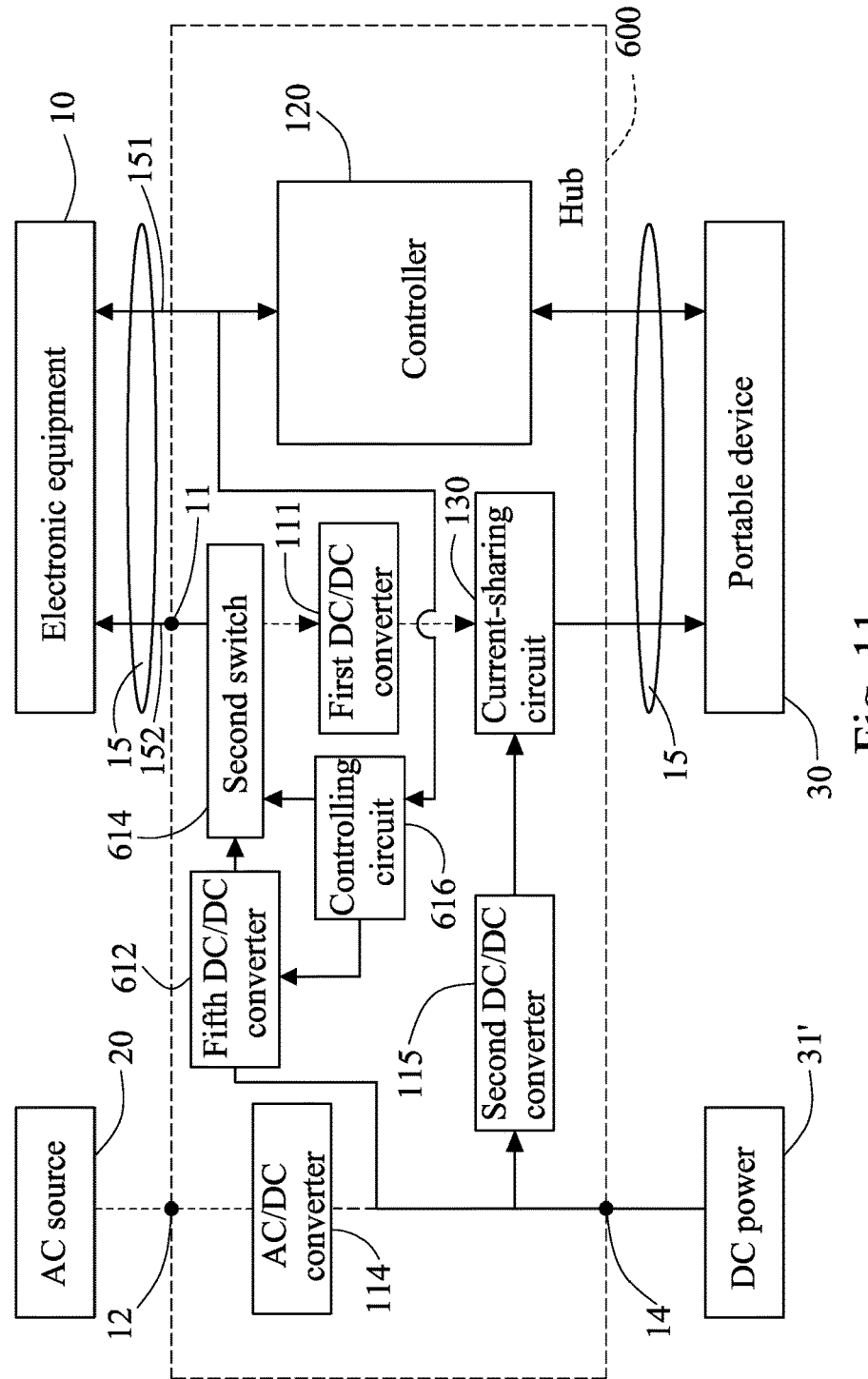
FIG. 11 is a schematic view illustrating another operational status of a hub according to the fifth embodiment.

Referring to FIG. 11, FIG. 11 is a schematic view illustrating another operational status of a hub according to the fifth embodiment. When the third connector 12 is not plugged into the AC source 20, the first connector 11 is electrically connected to the electronic equipment 10, and the fourth connector 14 is electrically connected to the DC power 31', the controlling circuit 616 asks the fifth DC/DC converter 612 to adjust output voltage, and controls the second switch 614 to enable the electrical connection between the electronic equipment 10 and the fifth DC/DC converter 612, and disenable the electrical connection between the electronic equipment 10 and the first DC/DC converter 111. In this status, the electronic equipment 10 can be transferred to the power receiving end via the signal communications, such as via USB PD protocol, and make the portable device 30 and the electronic equipment 10 be charged by the DC power 31'.

Referring FIG. 9-FIG. 11, the AC source (such as mains electricity), the power outputted from the USB port of the electronic equipment (such as notebook computers), the power outputted from car charging dock, or the power outputted from the battery etc. can be applied in the hub 600, and those power can be converted to the required voltage level applied in notebook, computers, mobile phones, tablet PCs or AIO PC etc. In addition, the power bank module 510 disposed inside of the hub 500 shown in FIG. 7 also can be disposed in the interior of the hub 600.

Worth mention, the first DC/DC converter 111 of the described embodiment, the Buck converter or Boost converter, or buck-boost or SEPIC converter etc. can be applied in the second DC/DC converter 115, the third DC/DC converter 514, the fourth DC/DC converter 516, or the fifth DC/DC converter 612 according to the demand of product design. Besides, the current detector 112 and the power controller 113 applied in the hub 100 also can applied to the hub of other embodiments. Besides, the bridge controller 150 of the hub 400 shown in FIG. 6 also can be applied to the hub of other embodiments.

Figure 12:
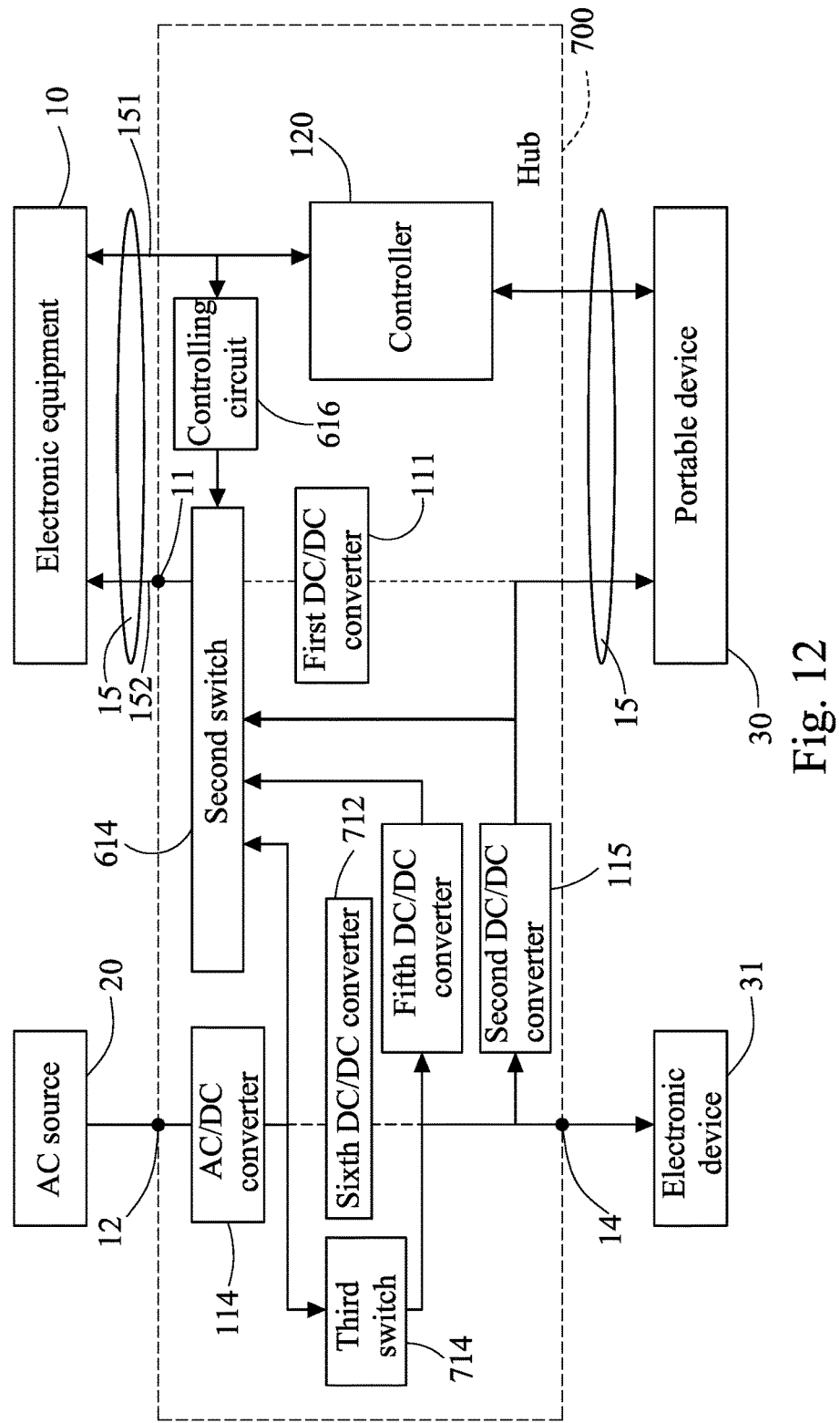
FIG. 12 is a schematic view illustrating the configuration of a hub according to a sixth embodiment.

Referring to FIG. 12, FIG. 12 is a schematic view illustrating the configuration of a hub according to a sixth embodiment. Compared to the hub 200 shown in FIG. 9, the hub 700 further comprises a third switch 714 and a sixth DC/DC converter 712. Wherein, the third switch 714 is electrically connected between the AC/DC converter 114 and the fifth DC/DC converter 612, and the sixth DC/DC converter 712 is electrically connected between the AC/DC converter 114 and the fourth connector 14. In the present embodiment, the sixth DC/DC converter 712 is a boost converter which electrically connected to the second switch 614, wherein the output voltage of sixth DC/DC converter 712 is 20V. In addition, the second DC/DC converter 115 is a buck converter which electrically connected to the second switch 614. In the present embodiment, the AC/DC converter 114, the fifth DC/DC converter 612, and the output voltage of the second DC/DC converter 115 are 20V, 12V, 5V respectively.

Wherein, when the third connector 12 of the hub 700 is plugged to the AC source 20, the third switch 714 will be conducted. Thus, AC/DC converter outputs power to the second switch 614 directly, as well as the fifth DC/DC converter 612 and the second DC/DC converter 115. Therefore, the second switch 614 will have at least three different input voltage levels simultaneously, which are 20V, 12V, 5V respectively. At this time, when the controlling circuit 616 determines the required voltage level of the electronic equipment 10, the second switch 614 will conduct to one of the three voltage levels. For example, when the required voltage mode of the electronic equipment 10 is 12V, the second switch 614 will conduct to the input voltage of 12V, and makes the electronic equipment 10 be charged by the voltage of 12V.

Figure 13:
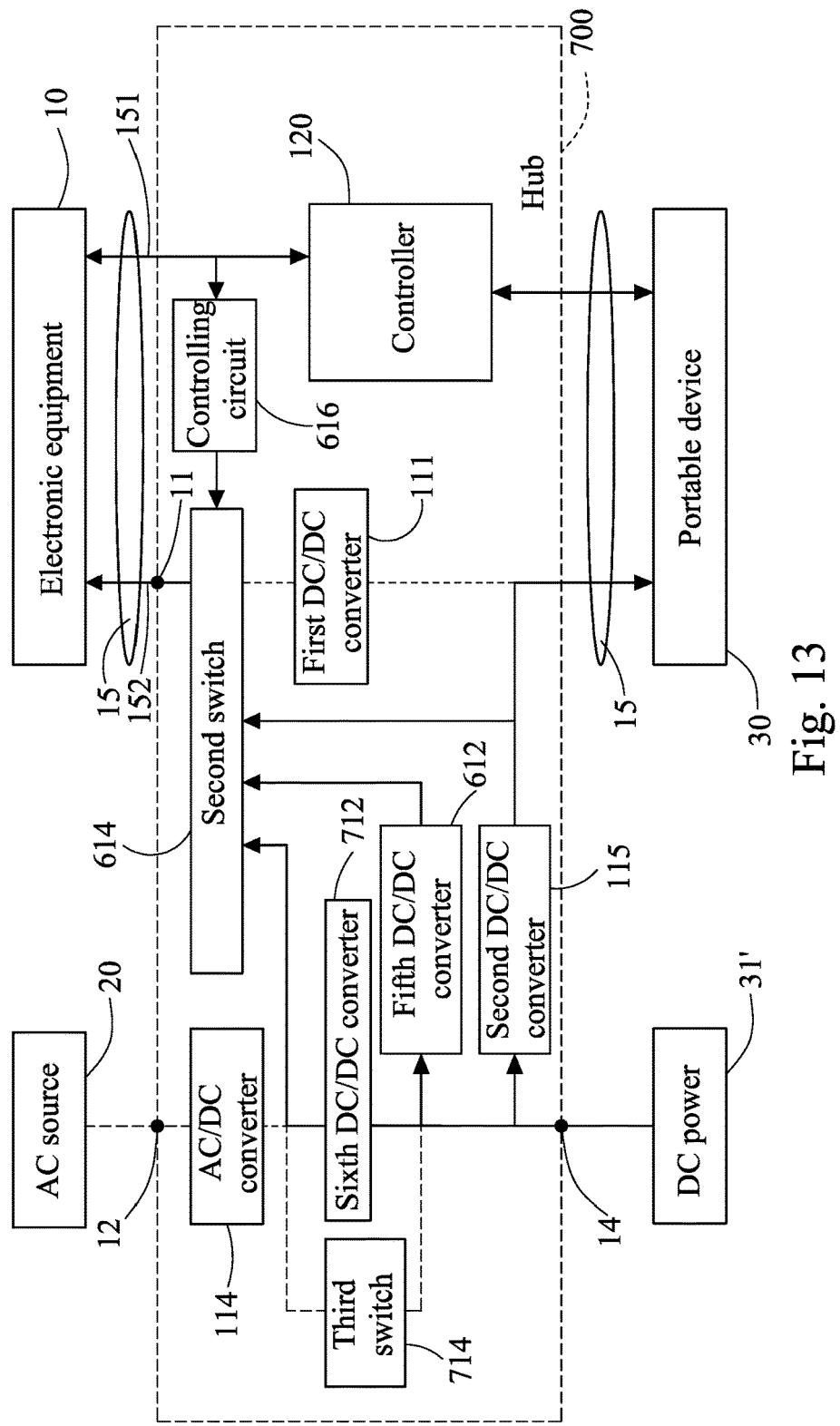
FIG. 13 is a schematic view illustrating another operational status of a hub according to the sixth embodiment.

Referring to FIG. 13, FIG. 13 is a schematic view illustrating another operational status of a hub according to the sixth embodiment. When the third connector 12 is not electrically connected to AC source 20 and the fourth connector 14 is electrically connected to DC power 31', the third switch 714 is not conducted, and makes the DC power 31' output power to the sixth DC/DC converter 712, the fifth DC/DC converter 612, and the second DC/DC converter 115 respectively. In the present embodiment, the voltage level of the DC power 31' is 12V, and the output voltage of the sixth DC/DC converter 712 will convert the DC power 31' from 12V to 20V.

Figure 14:
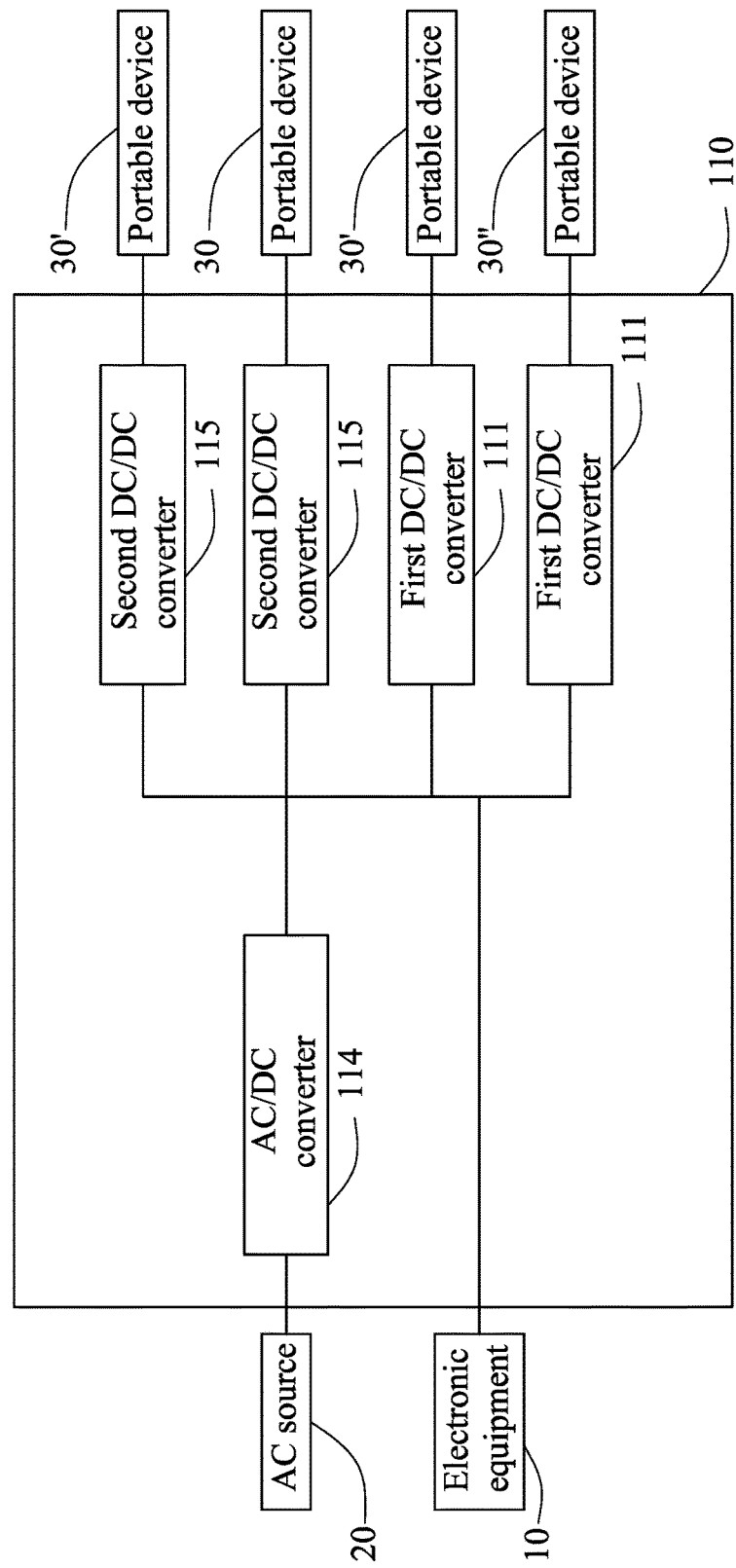
FIG. 14 is a schematic view illustrating an operational status with multiple first DC/DC converters and multiple second DC/DC converters.

In the described embodiment, just illustrating single first DC/DC converter 111 and single second DC/DC converter 115. However, multiple first DC/DC converters 111 or multiple second DC/DC converters 115 also can be applied according to the requirements. Referring to FIG. 14, multiple first DC/DC converters 111 and multiple second DC/DC converters 115 can be provided with different charging voltage to meet different charging demand of the portable device 30. Multiple portable devices 30, 30', 30" are, for example, smart mobile phones, tablet PCs, notebook computers, and the required charging voltage levels of the portable devices are not the same. Therefore, when the described devices are inserted into the hub simultaneously, the complex power converter 110 can provide various charging voltage levels via multiple DC/DC converters 111 to charge multiple portable devices 30, 30', 30" with various voltage demands.

Figure 15:
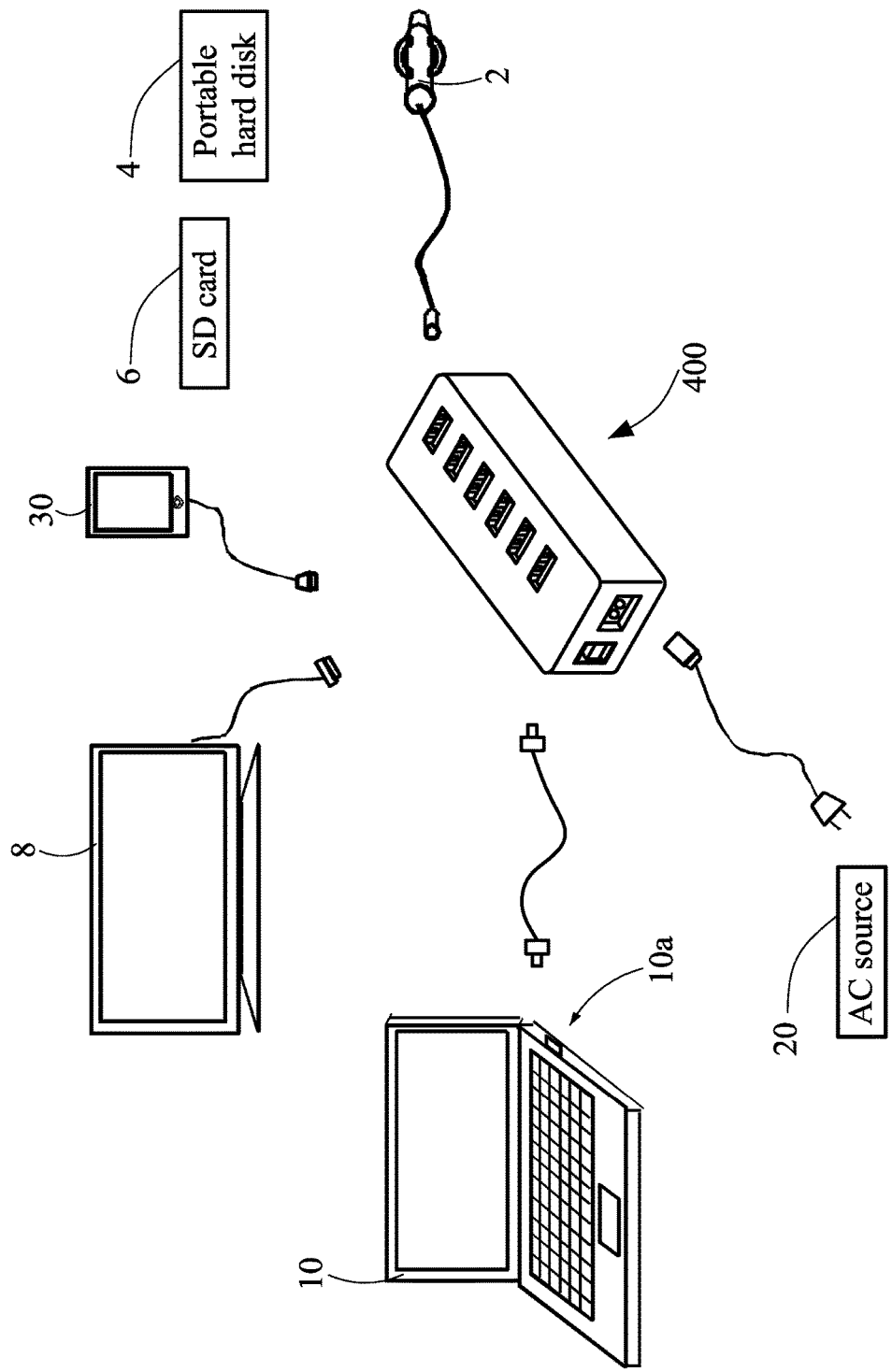
FIG. 15 is a schematic view illustrating the hub according to the present invention.

Referring to FIG. 15, FIG. 15 is a schematic view illustrating the hub according to the present invention, wherein the hub shown in FIG. 15 is the hub 400 of the fourth embodiment, and the electronic equipment 10 is the notebook computer. By the hub 400, the electronic equipment 10 just need one USB 3.1 PD (Power Delivery) type C port 10a to have a communication connection with the TV 8, the portable device 30, the SD card 6, and the portable hard disk 4. Or, the TV 8, the portable device 30, and the portable hard disk 4 can be power supplied by the hub 400. Or, the power of the AC source 20 can supply to the electronic equipment 10 and other devices by the hub 400. Or, the car battery also can be converted to the required voltage source for the portable device and notebook computers etc. via cigarette for car charger 2. To sum up, by the hub 400, the port amount of the electronic equipment 10 can be reduced and standardized. Thus, the types and specifications of the hub 400 can be standardized as well. Moreover, users can choose various combinations of various electronic equipments 10 and various hubs 400, and be more flexible, lower cost and convenient for users in purchase.

Figure 16:
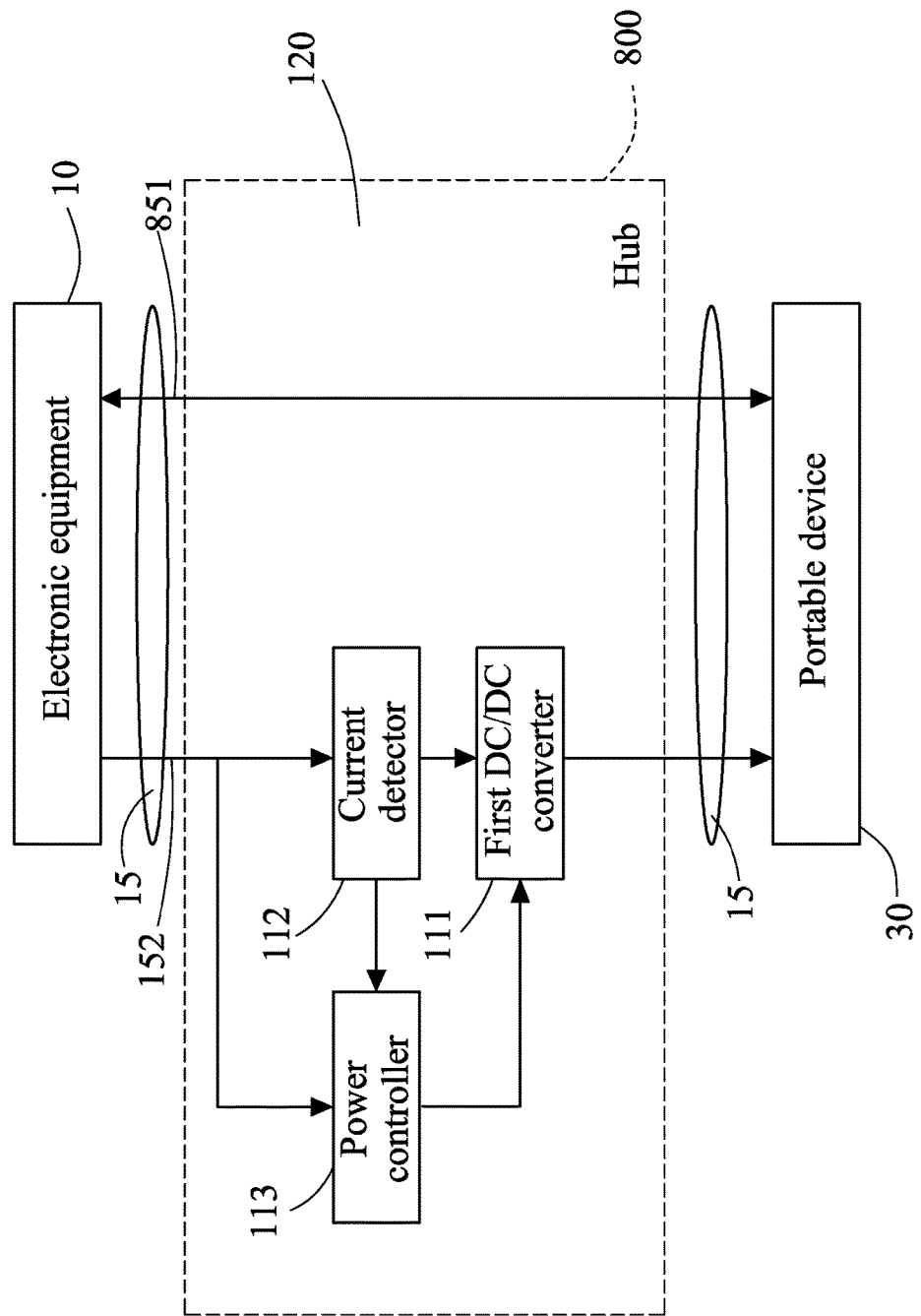
FIG. 16 is a schematic view illustrating the configuration of a hub according to a seventh embodiment.

Referring to FIG. 16, FIG. 16 is a schematic view illustrating the configuration of a hub 800 according to a seventh embodiment. Compared to the hub 100 shown in FIG. 2A, the hub 800 is without the controller 120. Therefore, a signal transmission line 851 of USB cable 15 is electrically connected between the electronic equipment 10 and the portable device 30, and a data transmission path is constructed between the electronic equipment 10 and the portable device 30 via the signal transmission line 851. As a result, A signal can be transmitted to the portable device 30 by the signal transmission line 851, and a rapid charge mode can be enabled when the portable device 30 receives the signal. The signal transmitted from the signal transmission line 851 can make the portable device 30 enable a charging mode for CDP so that be with rapid charge and data transmission simultaneously. Besides, in the construction of the USB type C, the equipment end has a communication with the device end to decide the charging mode or supply mode, wherein the current can be 5V/1.5 A or 5V/3 A, or even Power Delivery mode (12V or 20V). Although the description above contains many specifics, these are merely provided to illustrate the invention and should not be construed as limitations of the invention's scope. Thus it will be apparent to those skilled, in the art that various modifications and variations can be made in the system and processes of the present invention without departing from the spirit or scope of the invention.

What claimed is:

1. A hub, electrically connecting to an electronic equipment and at least a portable device located in external environment via an Universal Serial Bus cable, the Universal Serial Bus cable comprising a signal transmission line and a power transmission line, the hub comprising:
   a first connector, electrically connected to the electronic equipment via the Universal Serial Bus cable;
   at least a second connector, communicatively connected to the first connector and electrically connected to the portable device via the Universal Serial Bus cable, wherein a data transmission between the portable device and the electronic equipment mutually is via the signal transmission line, the first connector, and the second connector; and
   a first DC/DC converter, an input terminal of the first DC/DC converter is electrically connected to the electronic equipment via the power transmission line, an output terminal of the first DC/DC converter is electrically connected to the portable device via the power transmission line, the first DC/DC converter is applied to output stable voltage to the portable device;
   wherein the first connector is Universal Serial Bus 3.1 Power Delivery type C port, and electronic equipment can be either in a charged mode or in a power supplying mode via the Universal Serial Bus Power Delivery protocol.

2. The hub of claim 1, further comprising a power converter and a third connector, the power converter is electrically connected to alternating current source located in external environment via third connector, the power converter comprising:
   an AC/DC converter, an input terminal of the AC/DC converter is electrically connected to the alternating current source via the third connector; and
   a second DC/DC converter, an input terminal of the second DC/DC converter is electrically connected to the AC/DC converter, and an output terminal of the second DC/DC converter is electrically connected to the portable devices.

3. The hub of claim 2, further comprising a fourth connector, the fourth connector is electrically connected to an electronic equipment or a direct current power located in external environment, wherein the fourth connector disposed inside of the hub is electrically connected to an output terminal of the AC/DC converter and the input terminal of the second DC/DC converter.

4. The hub of claim 1, further comprising:
   a fourth connector, electrically connected to an electronic device or a direct current power located in external environment; and
   a second DC/DC converter, an input terminal of the second DC/DC converter is electrically connected to the fourth connector, and the output terminal of the second DC/DC converter is electrically connected to the portable device.

5. The hub of claim 2, further comprising a current-sharing circuit, wherein the output terminal of the first DC/DC converter and the output terminal of the second DC/DC converter are electrically connected to the current-sharing circuit, and an output terminal of the current-sharing circuit is electrically connected to the portable device.

6. The hub of claim 2, wherein the second DC/DC converter being with constant current and constant voltage.

7. The hub of claim 1, further comprising a power controller and a current detector, the power controller is electrically connected to the first DC/DC converter, the current detector is electrically connected between the first DC/DC converter and the electronic equipment, an output voltage and an output current of the electronic equipment is detected by the power controller via the current detector; when the output voltage is less than a preset voltage value, or the output current is more than a preset current value, the output voltage of the first DC/DC converter is lowered by the power controller.

8. The hub of claim 1, wherein the electronic equipment has an Universal Serial Bus port, the Universal Serial Bus port is electrically connected to the first connector.

9. The hub of claim 2, further comprising:
   a first current detector, electrically connected to the second DC/DC converter for detecting an output voltage and an output current of the second DC/DC converter;
   a third DC/DC converter, electrically connected to the first current detector;
   at least a fourth DC/DC converter, electrically connected to the third DC/DC converter, converting an output voltage of the third DC/DC converter to a required charging voltage of the portable device;
   an energy storage, electrically connected between the third DC/DC converter and the fourth DC/DC converter; and
   an energy storage controlling circuit, electrically connected to the second DC/DC converter, the first current detector, the third DC/DC converter, and the energy storage, the energy storage controlling circuit has a first preset current and a first preset voltage;
   wherein, when the output current of the second DC/DC converter is less than the first preset current value, and the output voltage of the second DC/DC converter is more than the first preset voltage value, the output voltage of the third DC/DC converter is set to be more than an output voltage of the energy storage by the energy storage controlling circuit so that the portable device and the energy storage are charged by the second DC/DC converter at the same time; when the output current of the second DC/DC converter is more than the first preset current value or the output voltage of the second DC/DC converter is less than the first preset voltage value, the output voltage of the third DC/DC converter drops to the voltage of the energy storage by the energy storage controlling circuit, and the portable devices are charged by the second DC/DC converter and the energy storage simultaneously.

10. The hub of claim 9, further comprising a second current detector and a first switch, the second current detector and the first switch are electrically connected to each other, the second current detector is electrically connected to the energy storage controlling circuit and the node between the third DC/DC converter and the fourth DC/DC converter respectively, the first switch is electrically connected to the energy storage controlling circuit and the energy storage respectively, the second current detector is applied for detecting a charging current and a discharging current of the energy storage; wherein, when the charging current or the discharging current of the energy storage is more than a second preset current value, or when a charging voltage or a discharging voltage of the energy storage is beyond a second preset voltage value, the first switch is not conducted.

11. The hub of claim 10, wherein the electronic equipment can be charged, and the hub further comprising:

a fifth DC/DC converter, electrically connected to the AC/DC converter;

a second switch, electrically connected between the electronic equipment and the fifth DC/DC converter, and the second switch is electrically connected between the electronic equipment and the first DC/DC converter; and a controlling circuit, an output terminal of the controlling circuit is electrically connected to the fifth DC/DC converter and the second switch, and an input terminal of the controlling circuit is electrically connected to the electronic equipment for signal transmission each other;

wherein, the output voltage of the fifth DC/DC converter is adjustable by the controlling circuit, the controlling circuit controls the second switch to enable or disable the electrical connection between the electronic equipment and the fifth DC/DC converter, and enable or disable the electrical connection between the electronic equipment and the first DC/DC converter.

12. The hub of claim 11, wherein when the third connector is not electrically connected to the alternating current source, the first connector is electrically connected to the electronic equipment, and when the fourth connector is not electrically connected to the electronic devices or the direct current power, the controlling circuit controls the second switch to disable the electrical connection between the electronic equipment and the fifth DC/DC converter, and enable the electrical connection between the electronic equipment and the first DC/DC converter.

13. The hub of claim 11, wherein when the third connector is electrically connected to the alternating current source, and the first connector is electrically connected to the electronic equipment, the controlling circuit controls the second switch to enable the electrical connection between the electronic equipment and the fifth DC/DC converter, and disenable the electrical connection between the electronic equipment and the first DC/DC converter.

14. The hub of claim 11, wherein when the third connector is not electrically connected to the alternating current source, the first connector is electrically connected to the electronic equipment, and when the fourth connector is electrically connected to the direct current power, the controlling circuit controls the second switch to enable the electrical connection between the electronic equipment and the fifth DC/DC converter, and disenable the electrical connection between the electronic equipment and the first DC/DC converter.

15. The hub of claim 11, further comprising:
a third switch, electrically connected between the AC/DC converter and the fifth DC/DC converter; and
a sixth DC/DC converter, electrically connected between the AC/DC converter and the fourth connector;
wherein, the sixth DC/DC converter is a boost converter and electrically connected to the second switch, the second DC/DC converter is a buck converter and electrically connected to the second switch.

16. The hub of claim 15, wherein the AC/DC converter is electrically connected to the second switch.

17. The hub of claim 1, wherein the rapid charge mode means the charging current for the portable device is higher than 500 mA.

18. A hub, electrically connecting to an electronic equipment and at least a portable device located in external environment, comprising:
a first connector, electrically connected to the electronic equipment;
at least a second connector, electrically connected to the portable devices and communicatively connected to the first connector, wherein data transmission between the portable device and the electronic equipment mutually is via the first connector and the second connector;
a first current detector, electrically connected to the first connector for detecting an output voltage and an output current of the electronic equipment;
a third DC/DC converter, electrically connected to the first current detector;
at least a fourth DC/DC converter, electrically connected to the third DC/DC converter and the second connector, converting an output voltage of the third DC/DC converter to a required charging voltage for the portable device;
an energy storage, electrically connected between the third DC/DC converter and the fourth DC/DC converter; and
an energy storage controlling circuit, electrically connected to the electronic equipment, the first current detector, the third DC/DC converter, and the energy storage, the energy storage controlling circuit has a first preset current value and a first preset voltage value;
wherein, when the output current of the electronic equipment is less than the first preset current value, and the output voltage of the third DC/DC converter is more than the voltage of the energy storage, by the energy storage controlling circuit so that the portable device and the energy storage are charged by the electronic equipment at the same time; when the output current of the electronic equipment is more than the first preset current value or the output voltage of the electronic equipment is less than the first preset voltage value, the output voltage of the third DC/DC converter drops to the voltage of the energy storage by the energy storage controlling circuit, and the portable devices are charged by the electronic equipment and the energy storage simultaneously.

19. The hub of claim 18, wherein the first connector is Universal Serial Bus 3.1 Power Delivery type C port, and electronic equipment can be either in a charged mode or in a power supplying mode via the Universal Serial Bus Power Delivery protocol.

* * * * *